United States Patent [19]
Yamaguchi

[11] Patent Number: 6,023,524
[45] Date of Patent: *Feb. 8, 2000

[54] METHOD FOR DETERMINING AMOUNT OF EXPOSURE

[75] Inventor: Yoshihiro Yamaguchi, Kanagawa, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/769,051

[22] Filed: Dec. 18, 1996

[30] Foreign Application Priority Data

Dec. 20, 1995 [JP] Japan .................................. 7-331687

[51] Int. Cl.⁷ ........................................................ G06K 9/00
[52] U.S. Cl. ........................................... 382/162; 382/164
[58] Field of Search .................................. 382/164, 165, 382/173, 174, 175, 181, 190, 195, 274; 396/225, 319, 429; 355/40, 77; 358/527, 500; 356/404

[56] References Cited

U.S. PATENT DOCUMENTS

| | | | |
|---|---|---|---|
| 4,244,655 | 1/1981 | Asai et al. ............................... | 356/404 |
| 5,130,745 | 7/1992 | Cloutier et al. ........................... | 355/40 |
| 5,194,892 | 3/1993 | Robison ................................... | 355/40 |
| 5,278,921 | 1/1994 | Nakamura et al. ....................... | 382/167 |
| 5,309,228 | 5/1994 | Nakamura ............................... | 358/500 |
| 5,557,688 | 9/1996 | Nakamura ............................... | 382/164 |

FOREIGN PATENT DOCUMENTS

| | | | | |
|---|---|---|---|---|
| 52-156624 | 12/1977 | Japan | ............................ | G03B 27/72 |
| 52-156625 | 12/1977 | Japan | ............................ | G03B 27/72 |
| 53-12330 | 2/1978 | Japan | ............................ | G03B 27/72 |
| 53-145620 | 12/1978 | Japan | ............................ | G03B 27/76 |
| 53-145621 | 12/1978 | Japan | ............................ | G03B 27/76 |
| 53-145622 | 12/1978 | Japan | ............................ | G03B 27/76 |
| 62-115430 | 5/1987 | Japan | ............................ | G03B 27/32 |
| 62-115432 | 5/1987 | Japan | ............................ | G03B 27/32 |
| 62-189456 | 8/1987 | Japan | ............................ | G03B 27/80 |
| 62-189457 | 8/1987 | Japan | ............................ | G03B 27/80 |
| 63-138340 | 6/1988 | Japan | ............................ | G03B 27/73 |
| 63-178222 | 7/1988 | Japan | ............................ | G03B 27/72 |
| 4-346332 | 12/1992 | Japan | ............................ | G03B 27/73 |
| 4-346334 | 12/1992 | Japan | ............................ | G03B 27/73 |
| 61-186652 | 6/1994 | Japan . | | |
| 6-186652 | 7/1994 | Japan | ............................ | G03B 27/73 |

Primary Examiner—Amelia Au
Assistant Examiner—Samir Ahmed
Attorney, Agent, or Firm—Sughrue, Mion, Zinn, Macpeak & Seas, PLLC

[57] ABSTRACT

There is provided a method in which a human image including a face of a person is extracted from a color original image at a high probability and an amount of exposure is determined so that the human image is reproduced at the most suitable density. Photographing information is read from a negative film, a color original image is divided, on the basis of the photometric data of the three colors of red, green and blue, into small regions in which color and density are the same for each of pixels on the original image, and characteristic values which indicates characteristics of the small regions are calculated. Subsequently, a small region which is estimated, on the basis of photographing information, to be a background whose size is largely different from the size of a main image, and a small region which is determined to have a low probability of being the main image on the basis of positional information are obtained, and these small regions are eliminated as non-main regions. A small region in a predetermined range of color or density corresponding to the human image is extracted, as an effective region, from other small regions than the eliminated non-main regions. The density of the human image is estimated by using the average luminance in the effective region, and the estimated density is outputted.

12 Claims, 16 Drawing Sheets

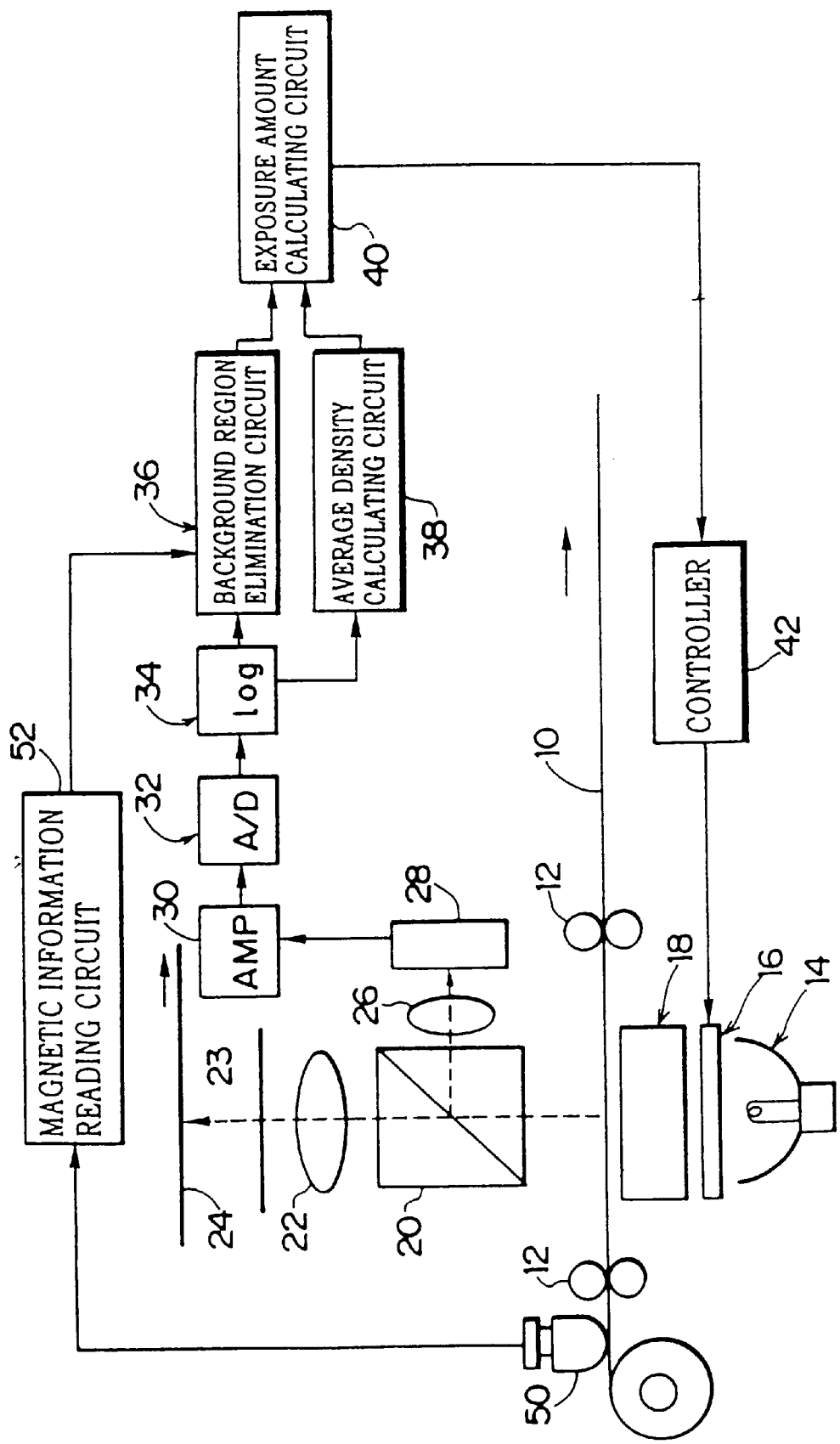
F I G. 1

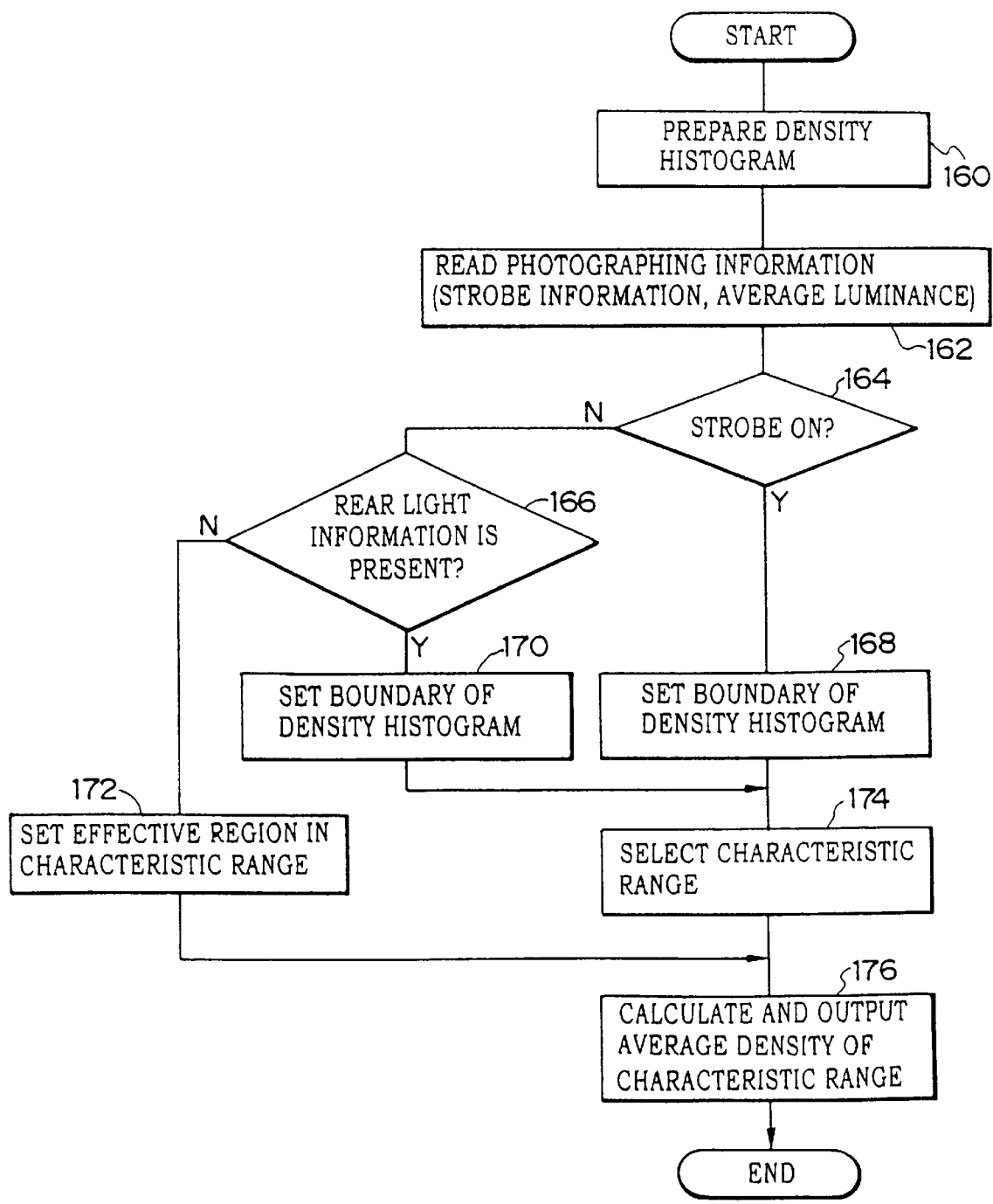

ORIGINAL IMAGE

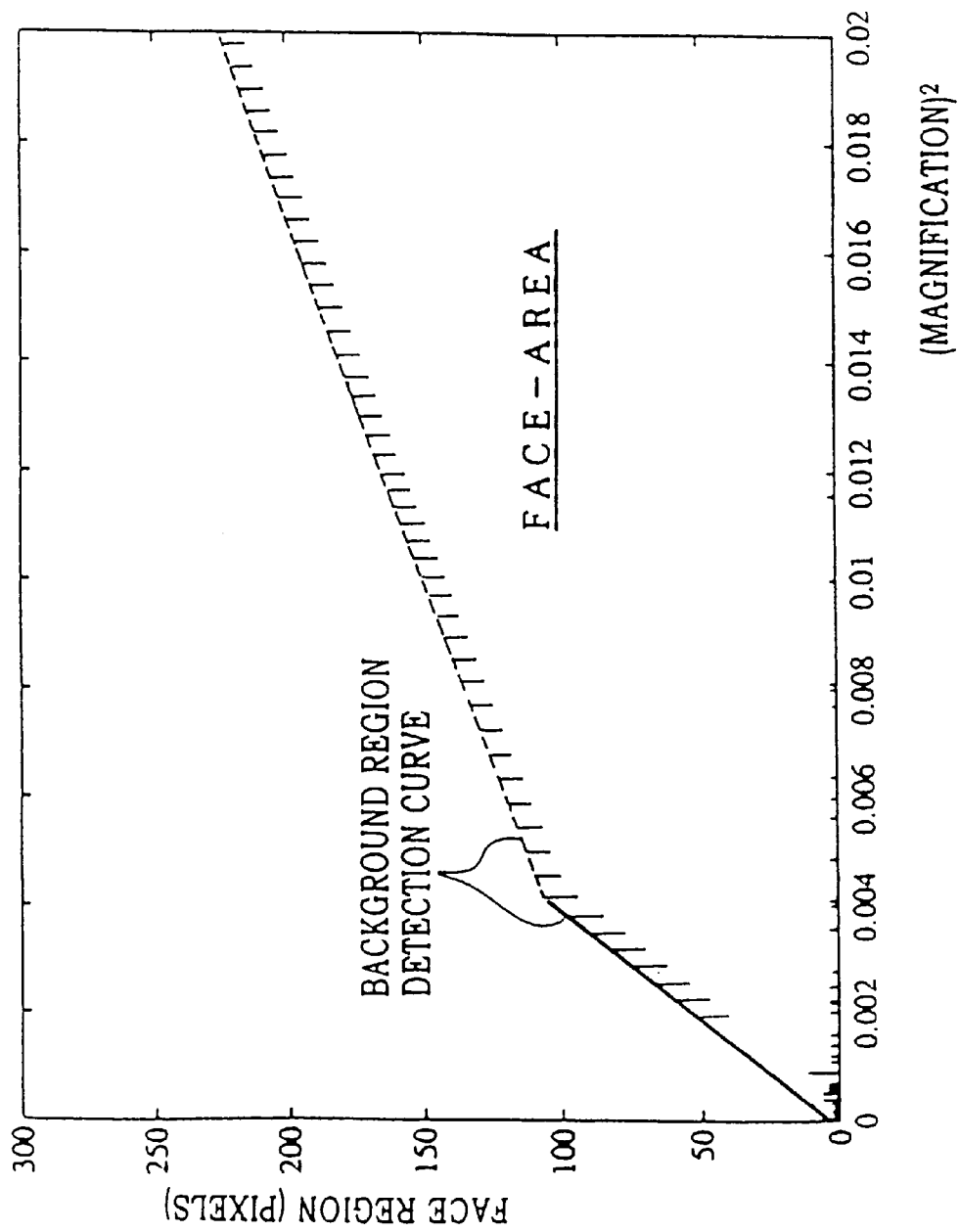

F I G. 1 0
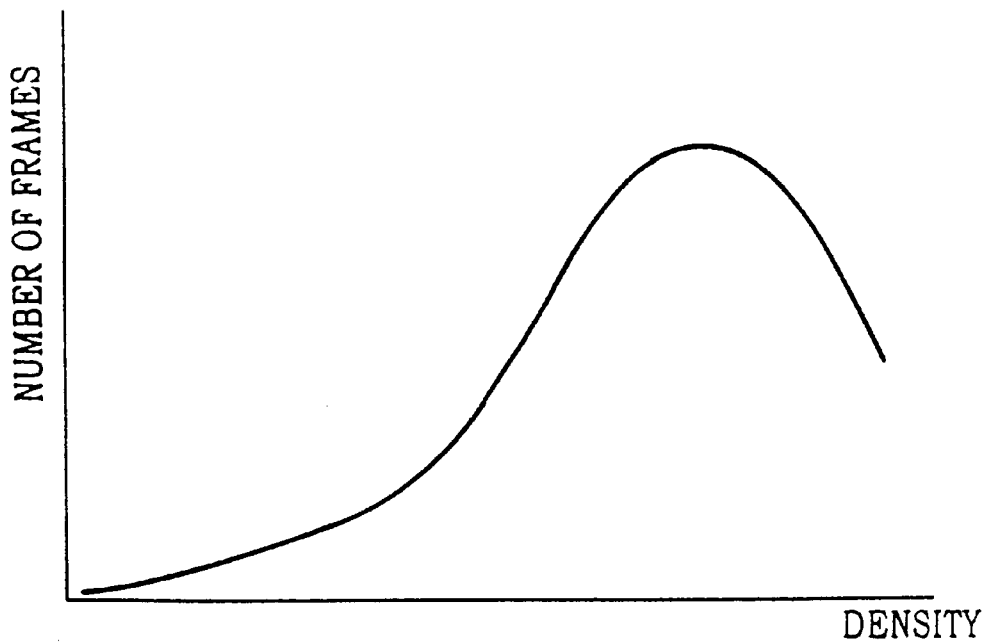
F I G. 1 1
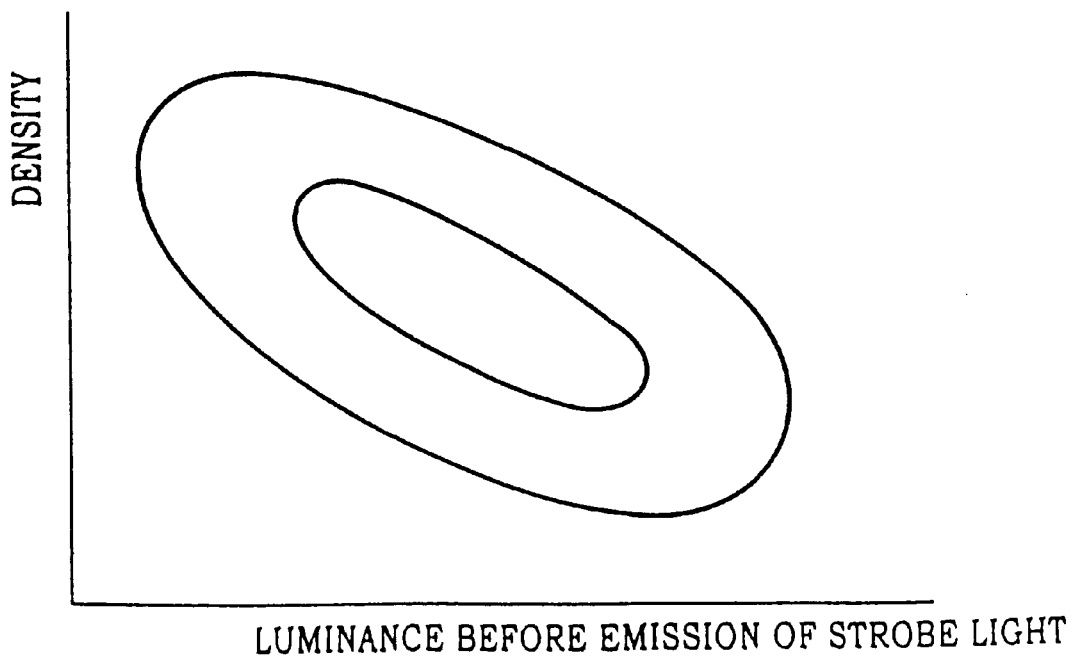

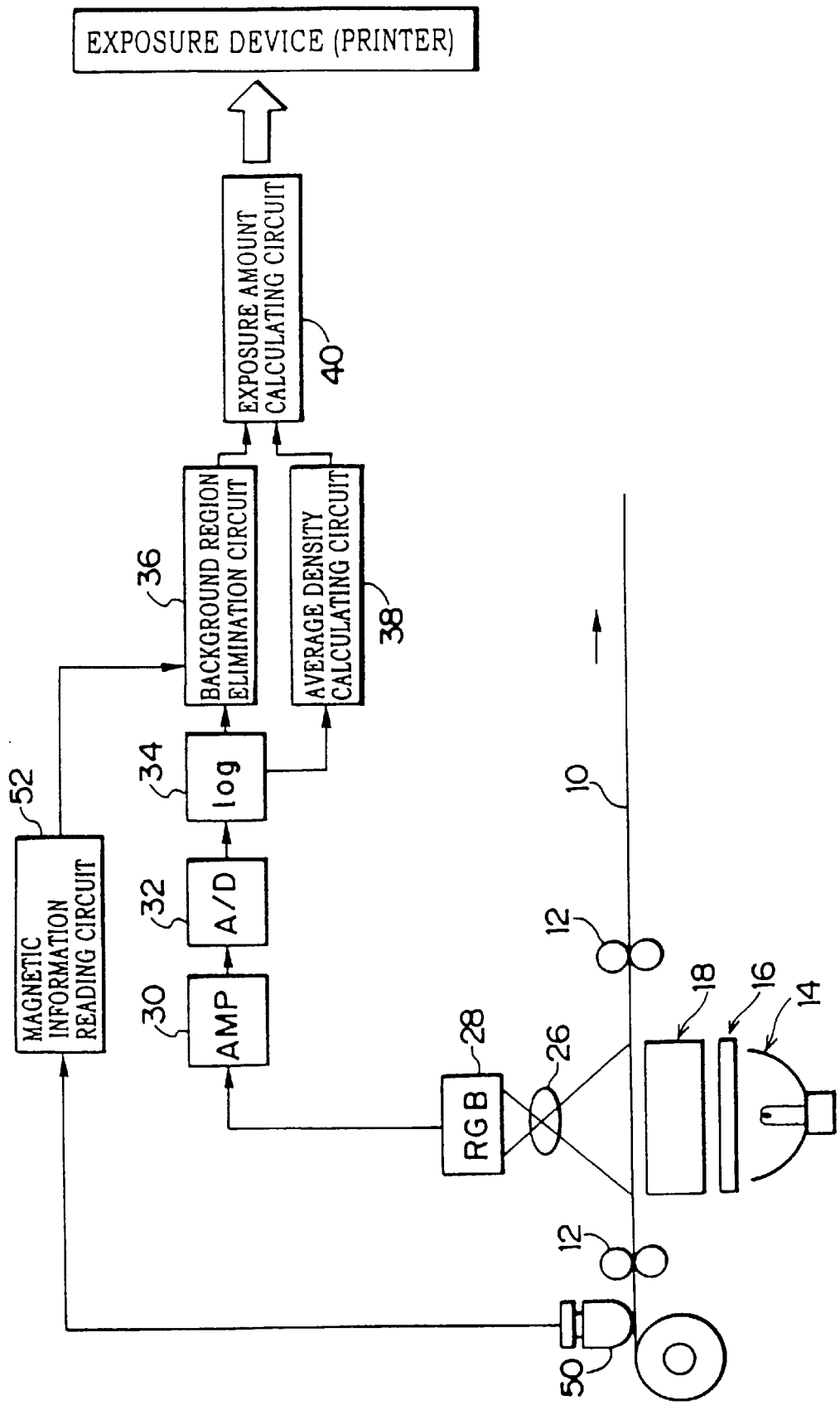
F I G. 1 2

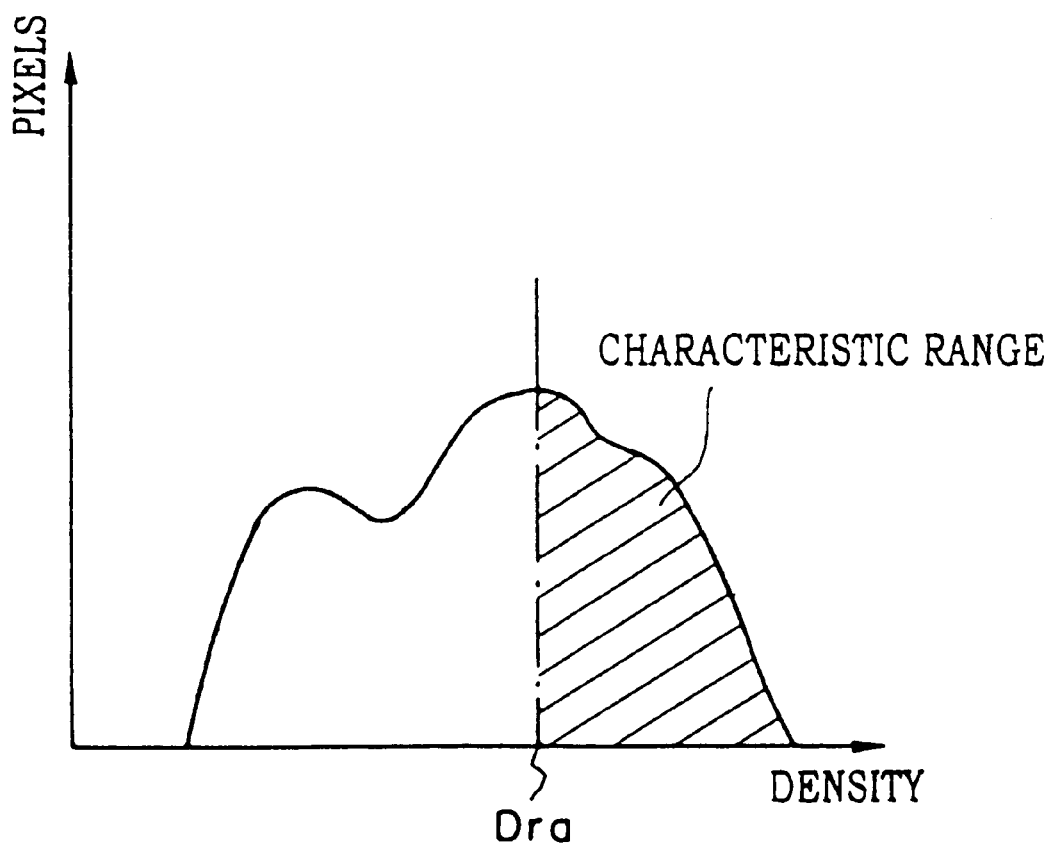

ORIGINAL IMAGE

METHOD FOR DETERMINING AMOUNT OF EXPOSURE

BACKGROUND OF THE INVENTION

1. Field of the Invention

The present invention relates to a method for determining an amount of exposure, and particularly to a method for determining an amount of exposure in which when color copy or black-and-white copy of a color original image is effected, data of a human image which is a main image including a human face is extracted from the color original image, and an amount of exposure is determined on the basis of the extracted data.

2. Description of the Related Art

When a photograph of a person is viewed, the region which is most noticed is the person's face. In order to produce a photograph of high quality, it is necessary to print the person's face at a proper color and a proper density.

Conventionally, there has been known a method in which a human face region in an original image of a color film is designated by a light pen, density data of the human face is extracted, and on the basis of the extracted density data, an amount of exposure is determined so that the color and density of the face can be printed appropriately. The technique like the above is disclosed in Japanese Patent Application Laid-Open (JP-A) Nos. 62-115430, 62-115431, 62-115432, 62-189456, 62-189457, 63-138340, and 63-178222.

However, in the above-described prior art, since it is necessary that an operator should designate the face region by the light pen for each of images, a drawback arises in that a lot of time is required for a printing operation. Further, since the operator must visually designate the face region, automation of the operation is difficult.

Further, there has been known a method in which a magnetic layer is formed on a reverse surface of a color film, magnetic information including camera information about a type or the like of camera, photographing information such as a focal length at the time of photographing processing, f-number, and the like, development information such as a number for indicating a processing laboratory, and the like is recorded, and an amount of exposure is determined by using the magnetic information. The technique like this is disclosed in U.S. Pat. Nos. 5,130,745 and 5,194,892.

However, even if the magnetic information is recorded on the color film as described above, it is not possible to designate a main subject on the color film. For this reason, the operator must designate the face region in a visual manner.

Accordingly, there has been proposed a method for automatically extracting data of a human face. As an example of this method, a method for extracting data of a human face by extracting flesh-color data is disclosed in Japanese Patent Application Laid-Open (JP-A) Nos. 52-156624, 52-156625, 53-12330, 53-145620, 53-145621 and 53-145622. Namely, a color original image is divided into a large number of photometric points, each of the photometric points is separated into three colors of R (red), G (green) and B (blue) and is photometrically measured, and then, it is determined whether the color of each photometric point calculated from the obtained photometric data exists in a flesh-color range. A cluster (group) of photometric points which has been judged to be in the flesh-color range is set as face density data.

However, in this method, the color in the flesh-color range is assumed to be the face density data. For this reason, the density data of flesh-colored or approximately flesh-colored regions other than the face region, for example, ground or tree trunks, which exist as a background of a main subject, or clothes of a person may be mistakenly extracted as the face density data. Accordingly, the face density data extracted in accordance with photographic scenes differ from each other, and there is a possibility that only the face density data cannot be automatically extracted in a stabilized manner. For this reason, there exists a drawback in that color and density of a printed to be prepared cannot be reproduced appropriately.

In order to solve this drawback, there has been proposed a method for extracting data of a human face from a histogram for the hue or the saturation, which is disclosed in Japanese Patent Application Laid-Open (JP-A) Nos. 4-346332 and 4-346334. Namely, a histogram for the hue or the saturation is obtained on the basis of data obtained by photometrically measuring light into which three colors are separated, a color original image is divided by a hue value or a saturation value corresponding to each population, a region representing the feature of an image is selected from the divided regions, and data of the selected region is extracted as feature image data, namely, human face data.

However, it is very likely that a region near an edge which is separated from a central portion on a color original image will be a background, and there is a low possibility that an image corresponding to a main subject (which is principally an image of a human face and will be hereinafter referred to as a human image) is included in this region. Accordingly, in the case in which the feature image data is extracted from the histogram for the hue or the saturation in the above-described manner, if a region similar to the human face exists in the background, data of the background is also extracted in addition to the human image data. As a result, the color and density of a print to be prepared becomes unstable.

Consequently, there has been proposed a method for extracting data of a human face from an effective region with a background having a low probability of including a human image which is eliminated from a color original image. An example of this method is disclosed in Japanese Patent Application Laid-Open (JP-A) No. 6-186652, in which region merging is carried out in such a manner that pixels are merged by using data obtained by photometrically measuring light into which three colors are separated and a region whose size is largely different from that of a main subject, which is obtained based on photographing information such as a focal length or the like recorded on a color film, is judged to be a background region and excluded from the merged regions. The density of the human image is estimated from the effective region after the background has been excluded and the estimated density is set as the human density data.

However, even in the effective region from which the background is excluded, it is difficult to automatically specify a position of a human image included in this effective region. For this reason, when an amount of exposure is determined by using the extracted data, the color and density of a print to be prepared becomes unstable.

SUMMARY OF THE INVENTION

The present invention has been devised to overcome the above-described drawbacks and it is an object of the present invention to provide a method for extracting an amount of exposure in which an amount of exposure can be determined so that a human image which is a main image principally including a human face is automatically extracted, at a high probability, from a color original image such as a negative film and is reproduced at an optimum density.

The first aspect of the present invention is a method for determining an amount of exposure comprising the steps of: reading photographing information which indicates photographing conditions, the photographing information including positional information of a human image on a color original image, strobe information which indicates whether strobe light is on or off, and luminance information which indicates an average luminance of a subject including the human image prior to emission of the strobe light; obtaining a size of the human image, which indicates at least one of a length in a vertical or transverse direction, an area, and an aspect ratio of the human image, on the basis of the photographing information; dividing the color original image into a large number of pixels, separating each of the pixels into three colors of red light, green light and blue light, and photometrically measuring the red light, green light and blue light; determining, on the basis of data obtained by photometry, densities of the three colors of red, green and blue of each of the pixels, and dividing the color original image into small regions formed from continuous pixels in which at least one of colors obtained from the densities of the three colors and densities are the same or are similar; determining, on the basis of the positional information included in the photographing information, a predetermined region on the color original image in which the human image is not included; selecting, as an effective region, a region which remains after a small region which is of the same size of the human image or is greater than the size of the human image and a small region of which at least one portion is included in the predetermined region have been eliminated; by using densities of all pixels in the selected effective region, determining a density histogram, determining a characteristic range on the histogram on the basis of the strobe information and the luminance information which are included in the photographing information, and estimating a density of the human image on the basis of the densities of all pixels included in the characteristic range; and determining, on the basis of the estimated density, an amount of exposure for a copy media.

The second aspect of the present invention is a method for determining an amount of exposure according to the first aspect, wherein the photographing information includes magnification information, and on the basis of the magnification information, the size of the human image is determined.

The third aspect of the present invention is a method for determining an amount of exposure according to any one of the first and second aspects, wherein at least one of average densities of each of the three colors, an average density of the three colors, and an average color difference obtained from the average densities of the three colors is determined for each of the small regions, and a region, which remains after a small region not included in a predetermined condition is eliminated, is selected as an effective region, the predetermined condition corresponding to the determined at least one of the average densities of each of the three colors, the average density of the three colors, and the average color difference obtained from the average densities of the three colors.

The fourth aspect of the present invention is a method for determining an amount of exposure according to any one of the first through third aspects, wherein when a determination is made, on the basis of the strobe information, that photographing is effected without using strobe light, an average density of all pixels included in the selected effective region is determined, and on the basis of the determined average density, an amount of exposure for a copy media is determined.

The fifth aspect of the present invention is a method for determining an amount of exposure according to any one of the first through third aspects, wherein the photographing information includes back light information, and on the basis of the back light information and the strobe information, the characteristic range is determined on the density histogram.

In the method for determining an amount of exposure according to the present invention, the photographing information indicating photographing conditions, which includes the positional information of the human image on the color original image, the strobe information which indicates whether strobe light is on or off, and the luminance information which indicates an average density of a subject including the human image prior to emission of strobe light is read.

The photographing information indicating the photographing conditions can be read by being magnetically recorded on a magnetic layer provided on a photographic film, by being optically recorded on the photographic film, or by being recorded on a storing medium such as an IC card at the time of photographing. The photographing information can be recorded in such a manner as to be inputted by a photographer using a photographing device (for example, a camera) as an input device, and after photographing processing, the information can be recorded on the photographic film or the storing medium by an operator inputting using the input device. Accordingly, reading of the photographing information can be achieved by reading the information recorded magnetically or optically on the photographic film, or by reading the information recorded on the storing medium such as an IC card at the time of photographing processing.

For example, the positional information can be recorded in a readable manner by the photographer using the photographing device (for example, a camera) as the input device and inputting a position of the human image on the color original image, or by the operator inputting a position of the human image determined from the color original image. In this case, as the positional information which can be recorded by the photographing device, a position on the color original image determined from a visual line direction of the photographer, a single position (region) or a plurality of positions (regions) determined from a photometric region photometrically measured prior to the photographing processing, or a focused position can be used. Further, the strobe information and the luminance information can be recorded in the photographing device at the time of photographing processing. As the strobe information, an indication as to whether strobe light is on or off, which is recorded in the photographing device, can be used. Further, as the luminance information, an average luminance which is known as an average luminance of a subject photometrically measured in the photographing device prior to the emission of strobe light can be used.

Subsequently, on the basis of the read photographing information, the size of the human image is determined. As the size of the human image, at least one of a length in a vertical or transverse direction, an area, and an aspect ratio of a human image, for example, an image corresponding to the person's face is indicated. In order to determine the size of the human image, as described in the second aspect, the magnification information can be used. Namely, since the vertical and transverse dimensions of the color original image has been already known, so long as the magnification is determined, the size of a standard person's face on the color original image can be obtained.

The densities of the three colors of each pixel is determined on the basis of the photometric data obtained by photometrically measuring the color original image, and the color original image is divided into small regions which are each formed from continuous pixels in which at least one of the color obtained from the densities of the three colors and the density is the same or is similar. Accordingly, one small region on the color original image includes pixels in which at least one of the color and density is the same or is similar.

Here, when a photograph of a person is viewed, the region which is most noticed is principally the person's face, and in most cases, a background or the like is not noticed. Accordingly, a region which remains after the background is eliminated from the color original image has a high probability of including the human image having the person's face. Further, when the human image which is the main image mainly including the person's face is photographed, a focused region or a photometric region is a noticed region. It is likely that other region than the region on the color original image determined by the positional information in which the noticed region is reflected will not be the noticed region. Accordingly, the region which remains after unnoticed regions are eliminated has a high probability of including the human image having the person's face.

Consequently, in the present invention, a predetermined region on the color original image in which the human image is not included is determined on the basis of the positional information included in the photographing information, the small region of which at least one portion is included in the predetermined region, and the small region which is of a size greater than the same or similar size of the human image are eliminated, and the remaining region is selected as the effective region. As a result, the selected effective region has a high probability of including the human image which indicates characteristic of the color original image.

For example, almost all of a peripheral edge region and four corner regions on the color original image is a background or the like. The region which remains after the peripheral edge region and the four corner regions are eliminated from the color original image has a high probability of including the human image having the person's face. However, it is a possibility that the human image is included in the peripheral edge region or the four corner regions. A determination can be made from the positional information as to whether the human image is included somewhere in the peripheral edge region and the four corner regions. Accordingly, so long as the peripheral edge region and the four corner regions in which the region determined from the positional information is not included are determined as the predetermined region, the small region including one portion of the predetermined region and the small region which is of a size greater than the same or similar size of the human image are eliminated, and the remaining region is selected as the effective region, the selected effective region has a high probability of including the human image.

Meanwhile, it is a possibility that even the small region which is of the same or similar size of the human image has the different color and density from those of the human image. In this case, as described in the third aspect, at least one of the average densities of the three colors, the average density of the three colors, and the average color difference obtained from the average densities of the three colors is determined for each of the small regions, the small region not included in the predetermined condition corresponding to the determined at least one of the average densities of the three colors, the average density of the three colors, and the average color difference obtained from the average densities of the three colors is eliminated, and the remaining region can be selected as the effective region. As a result, only the small region which is of a size coincident or substantially coincident with that of the human image and which has the same or similar color and density of the human image can be included in the effective region, and the effective region has a high probability of including the human image.

On the other hand, the density of the human image on the color original image varies in accordance with the photographing conditions. For example, it is a possibility that, depending upon any one or a combination of a photographic film speed, brightness of a light source at the time of photographing, a shutter speed, and a diaphragm value, even an image of the identical subject has a different density of the color original image, or even images of different subjects have a similar density.

According to the present invention, the average luminance of the subject including the human image prior to the emission of strobe light, and an indication as to whether the color original image has been obtained by photographing using strobe light can be obtained from the strobe information and the luminance information. So long as the average luminance and the indication as to whether the color original image has been obtained by photographing using strobe light can be seen, a variation in densities of the pixels on the color original image can be estimated. For example, when the average luminance is low and strobe light is on, it is estimated that photographing using strobe light is effected in the dark. In this case, although light is sufficiently applied to the person, the vicinities of the person is dark, and therefore, the density of the human image has a high probability of becoming high. Further, when the average luminance is high and strobe light is on, it is estimated that photographing using strobe light is effected in the daytime and predetermined light is also applied to the vicinities of the person. In this case, the density of the image in the vicinities of the person becomes high and the density of the human image has a high probability of becoming low.

Accordingly, by using the densities of all pixels included in the selected effective region, the density histogram is obtained, and the characteristic range is determined on the density histogram on the basis of the strobe information and the luminance information included in the photographing information. The characteristic range is set, on the basis of the strobe information and the luminance information, so as to include a region in which there is a high probability that the density of the human image varies. Accordingly, since the characteristic range includes pixels of the human image at a high probability, the density of the human image is estimated on the basis of the densities of all pixels included in the characteristic range. For example, the average density of all the pixels is selected as the density of the human image.

As described above, so long as an amount of exposure is determined on the basis of the estimated density and a print is prepared, the human image on the color original image can be printed at the most suitable density or the most suitable density and color.

On the other hand, uniform light is applied to the color original image photographed without using strobe light, so that there is a low possibility that densities in the effective region are located in a specified region. For this reason, the average density of all the pixels in the selected effective region coincides with or approximates the density of the human image. Accordingly, as described in the fourth aspect, in the case in which a determination is made, on the basis of the strobe information, that the color original image has been obtained by photographing without using strobe light, so long as the average density of all the pixels in the selected effective region is determined as the density of the human image and on the basis of the determined average density, the amount of exposure for the copy media is determined, the human image on the color original image can be printed at the most suitable density or at the most suitable density and color.

Further, photographing processing is largely classified into two cases under the back light condition and the front light condition. When photographing processing is effected under the back light condition, the density of the image in vicinities of the person with the human image being not included becomes high and the density of the human image has a high probability of becoming low. Further, when photographing processing is effected under the front light condition, light is sufficiently applied to the person and the density of the human image has a high probability of becoming high. Accordingly, when an indication as to whether photographing processing is effected under the back light condition or the front light condition can be obtained, the density of the human image can be easily estimated. Consequently, as described in the fifth aspect, the back light information is included in the photographing information indicating the photographing conditions, and on the basis of the back light information and the strobe information, the characteristic range is determined on the histogram. As a result, a more effective pixel can be extracted from the selected effective region.

BRIEF DESCRIPTION OF THE DRAWINGS

FIG. 1 is a schematic diagram showing a printer according an embodiment of the present invention.

FIG. 6 is a flowchart showing details of step 110 in FIG. 2.

FIG. 8 is a diagram showing a relationship between a human image and a magnification.

FIG. 10 is a diagram showing a density histogram of effective regions including human images for a large number of original images.

FIG. 11 is a diagram showing a relationship between densities of the effective regions including human images for the large number of color original images and luminance values before emission of strobe light.

FIG. 12 is a schematic diagram of an exposure-amount calculating device to which the present invention is applied.

FIG. 13 is a diagram showing a density histogram for illustrating a process for estimating the density of a human image from an average luminance before emission of strobe light and from an area of the density histogram.

FIG. 14A is a diagram showing the non-main region; and FIG. 14B is a diagram for illustrating an example of a process for determining the non-main region.

DESCRIPTION OF THE PREFERRED EMBODIMENTS

Figure 2:
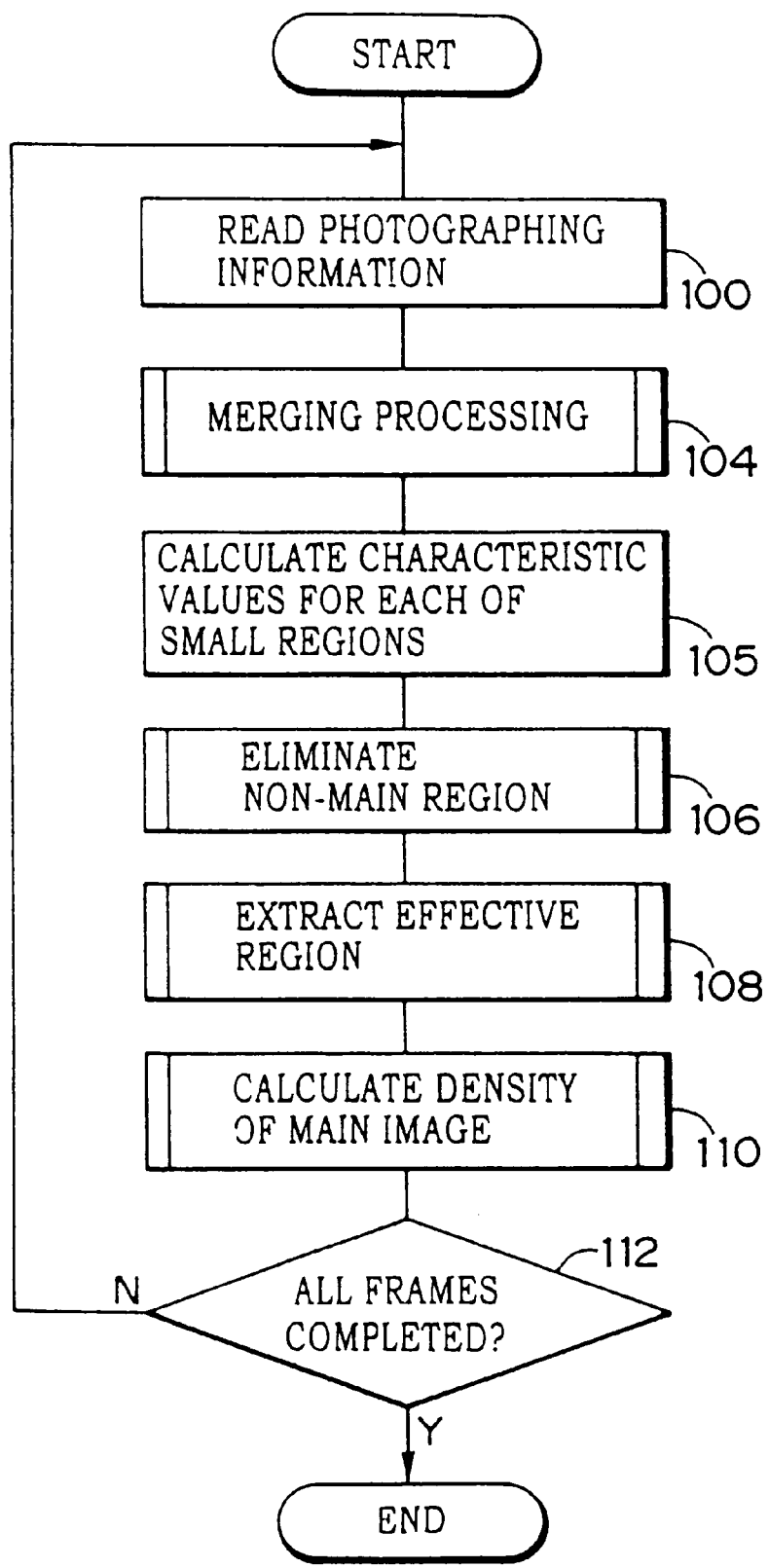
FIG. 2 is a flowchart showing a human image data calculating routine of a background-region eliminating circuit.

Referring now to the attached drawings, an embodiment of the present invention will be hereinafter described in detail. In this embodiment, the present invention is applied to an automatic printer.

As illustrated in FIG. 1, the automatic printer of the present embodiment is equipped with conveying rollers 12 for conveying a color negative film (which will be hereinafter referred to as a negative film). A magnetic head 50 is provided at an upstream side of the conveying rollers 12 in a direction in which the negative film 10 is conveyed, and the magnetic head 50 is disposed at a position where reading of information at the time of photographing, recorded on the negative film 10, is allowed. The magnetic head 50 is also connected to a background region elimination circuit 36 via a magnetic information reading circuit 52 which reads magnetic information from an output signal of the magnetic head 50.

Further, a light source 14, a color correction filter 16 and a diffusion box 18 are disposed in that order below the negative film 10 being conveyed by the conveying rollers 12.

Meanwhile, a beam splitter 20 is disposed above the negative film 10. A projective optical system 22, a black shutter 23, and a color paper (photographic printing paper) 24 are disposed in that order on one of the optical paths distributed by the beam splitter 20, and a projective optical system 26 and a CCD image sensor 28 are disposed in that order on the other optical path.

The CCD image sensor 28 divides an entire single image (single frame) of the negative film 10 into a plurality of pixels (for example, 256×256 pixels), divides each of the pixels into three colors of R (red), G (green) and B (blue), and photometrically measures the three colors. The CCD image sensor 28 is connected to a Log converter circuit 34 for conversion of density via an amplifier 30 which amplifies an output of the CCD image sensor and an analogue-digital (A/D) converter 32.

The Log converter circuit 34 is connected to an exposure amount calculating circuit 40 via the background region elimination circuit 36, and is also connected to the exposure amount calculating circuit 40 via an average density calculating circuit 38 which calculates an average density of an entire single image. The exposure amount calculating circuit 40 is connected to the color correction filter 16 via a controller 42 which drives the color correcting filter 16.

Photographing information which is the information relating to the color original image is magnetically recorded on the negative film 10 of the present embodiment. The negative film 10 includes an unillustrated magnetic layer previously coated thereon and the information can be magnetically recorded on the unillustrated magnetic layer.

The photographing information includes positional information P which indicates a position of a human image on the color original image and a non-main region (which will be explained later in detail) having a low probability of including the human image can be determined on the basis of the positional information P. The positional information P may be recorded by a photographer using a camera, or may be recorded by an operator inputting on the side of the automatic printer. Alternatively, the positional information P may also be recorded by an input device separate from the camera or the automatic printer.

Figure 18:
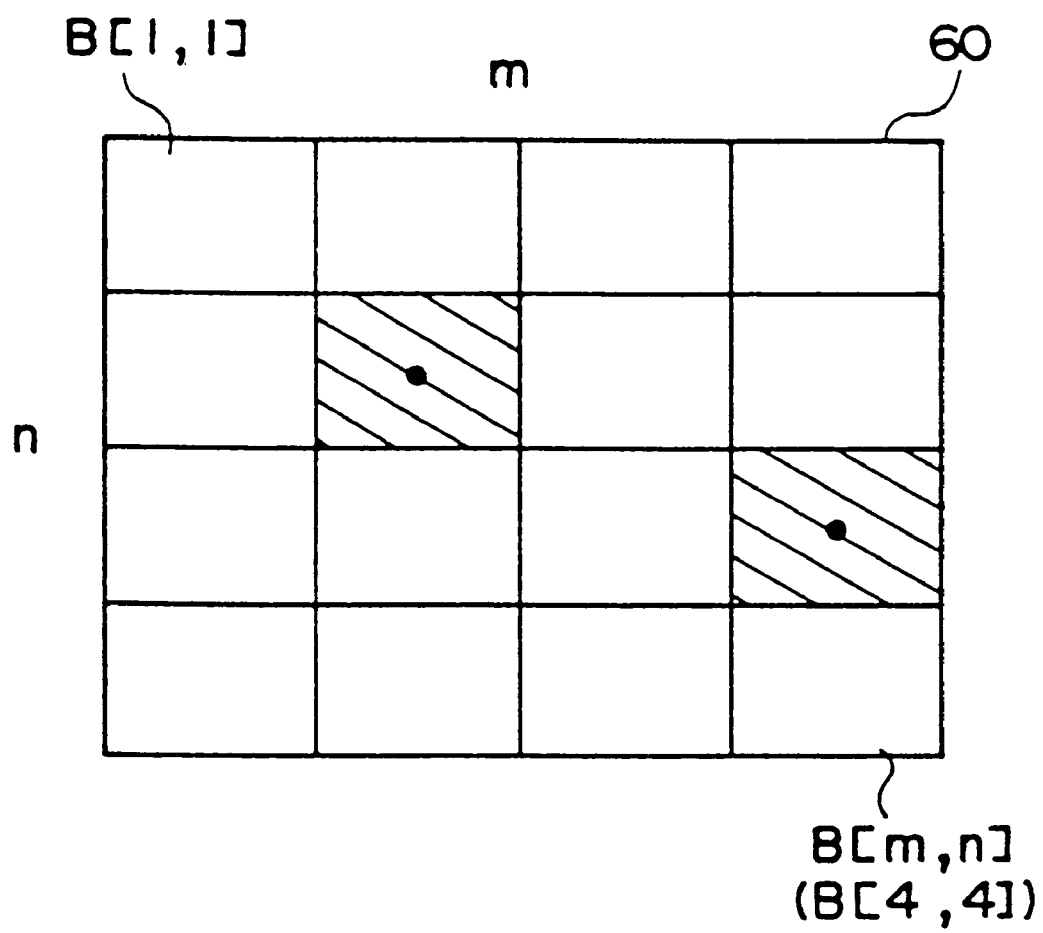
FIG. 18 is a diagram for illustrating a remarked region at the time of photographing, the remarked region being used as positional information.

An example of the case in which the positional information P is recorded by the camera will be described. As illustrated in FIG. 18, a camera photographing region 60 which is equivalent to the color original image on the negative film 10 is divided into m×n segments (in the example shown in FIG. 18, 4×4 segments) and a remarked region $B[i,j] (1 \leq i \leq m, 1 \leq j \leq n)$ is designated on the basis of the segments. The photographer effects photometric processing or focusing processing at the time of photographing with the human image, which is a main image including a human face, being set as the remarked region. The remarked region B[i,j] and the number thereof set at this time are recorded as the positional information P correspondingly to the frame. The positional information may be automatically recorded by the camera or may be recorded by the photographer operating an input device such as ten numeric keys or the like, provided on the camera. Accordingly, by reading the positional information P, a region on the color original image, which has a high probability of including the human image, can be determined. In the example shown in FIG. 18, the number of remarked regions is two and these regions are determined by B[2,2] and B[4,3 ]. The regions on the color original image determined by the remarked regions B[2,2] and B[4,3] each include the human image.

Meanwhile, as the method for determining the remarked region and recording the positional information, a method may be used in which a sight line of a photographer when observing into a finder is detected and the remarked region B[i, j] on an extending line of the visual line is obtained and recorded as the positional information. Further, since the photometric processing prior to photographing is effected for the remarked region in most cases, the photometric region at the time of photometric processing may be recorded as the remarked region B[i, j]. When this photometric region is used, there is a possibility that the entire photographing region 60 is used. For this reason, it is preferred that the positional information may be recorded by determining the main photometric region as the remarked region B, determining the remarked region B including the center of gravity of the photometric region, setting a remarked region B having a large weight from among a plurality of remarked regions B after having been weighted, or the like.

The above-described photographing information includes strobe information indicating whether or not strobe light is emitted by a strobe device, and luminance information indicating an average luminance of a subject at the time of photographing (for example, an average luminance prior to emission of strobe light).

Further, the photographing information includes a focal Length f of a photographic lens, a distance L from the photographic lens to a subject, a distance F to an image forming point, or a magnification m. On the basis of these values, the size of the human image on the color original image can be calculated. In this embodiment, an image of a human face for which fine color reproduction is required is employed as the human image. The image size S which is the size of the human image can be obtained by the following formula (1) on the basis of a standard length of a main subject (or a standard width, for example, a longer diameter or a shorter diameter of a face) S0, focal length f of the photographic lens, distance L from the photographic lens to the subject, and distance F to the image forming point. Further, the magnification m can be obtained by the following formula (2). Moreover, an area of the face can also be obtained from an area of a circle in a case in which the face is assumed to be a circle, or from a longer diameter and a shorter diameter of the face. Meanwhile, the magnification m may be directly recorded on the side of the camera. Further, the image size S may be obtained and recorded on the side of the camera. Alternatively, the magnification m may be recorded on the side of the camera and the image size S may be obtained on the side of the automatic printer. In addition, the above-described values may be recorded and the image size S may be obtained by calculation on the side of the automatic printer.

$$S = S0 \cdot f/(L-f) \quad (1)$$

$$m = f/(F-f) \quad (2)$$

Meanwhile, the above-described photographing information is magnetically recorded on the negative film 10, and may also be optically recorded by a bar code, an optical mark, or the like. It suffices that reading of the photographing information recorded optically is effected with a detector such as an optical sensor being provided in place of the above magnetic head. The photographic information can be read on the basis of an output from the detector. Further, the photographing information may be recorded in a storing medium such as an LSI card, IC card or the like without being recorded in the negative film 10.

Next, an operation of the present embodiment will be described. The negative film 10 which has been subjected to development processing is placed at a predetermined position in the automatic printer. When printing processing starts, an image frame of the negative film 10 to be printed is transferred to a printing position. While the negative film is being conveyed, the magnetic head 50 reads photographing information recorded on the negative film 10 and outputs a signal corresponding to the read photographing information. This output signal is amplified in the magnetic information reading circuit 52, and thereafter, is converted to a digital signal and inputted into the background region elimination circuit 36.

When the image frame reaches the printing position, the printing processing is started. Light irradiated from the light source 14 is transmitted through the color correction filter 16, the diffusion box 18, and the negative film 10, and is distributed by the beam splitter 20, and further, is received by the CCD image sensor 28 via the projective optical system 26. At this time, the black shutter 23 is closed.

When receiving light, the CCD image sensor 28 divides an entire single image into a plurality of pixels, separates each pixel into the three colors of R, G, B, photometrically measures the three colors, and outputs a photometric data signal. After having been amplified by the amplifier 30, the photometric data signal is converted to a digital signal by the A/D converter 32. Conversion of the density of the signal is effected at the Log converter circuit 34, and the photometric data signal is inputted into the background region elimination circuit 36 and the average density calculating circuit 38. The average density calculating circuit 38 effects calculation of the average density for one entire image surface.

At the background region elimination circuit 36, an effective region including a region of a human face on one image surface is estimated on the basis of the photographing information recorded on the negative film 10 and the photometric data, and photometric data of the three colors of R, G, B which indicates features of the effective region is calculated on the basis of the photometric data in the effective region, and is outputted. The exposure amount calculating circuit 40 calculates an amount of exposure by using the data outputted from the background region elimination circuit 36, and the average density obtained by the average density calculating circuit 38. The exposure amount calculating circuit 40 controls the color correction filter 16 via the controller 42, and opens and closes the black shutter 23 so that the printing processing is effected.

FIG. 2 shows a human image data calculating routine of the background region elimination circuit 36. In step 100, the photographing information recorded on the negative film 10 is read. In subsequent step 104, merging processing is effected by using a simple region merging method in which pixels are merged on the basis of the photometric data of the three colors of R, G, B for each of the pixels on the original image, so that the color original image is divided into small regions having the same colors and densities. When the merging processing is completed, in step 105, characteristic values indicating features of each small region is calculated.

The characteristic values include an average density of each of the three colors of R, G, B determined on the basis of the photometric data of the three colors of R, G, B for all of the pixels included in each of the small regions, and an average density of three colors, and further, include a maximum length, an area and central coordinates for each of the small regions. The maximum length in a longitudinal direction or in a transverse direction of each small region can be obtained by counting the number of pixels continuously located in the longitudinal or transverse direction in each small region. Further, since an area occupied by one pixel on the color original image has been already known, the area of each of the small regions can be obtained by counting the total number of pixels included in each of the small regions. Moreover, since the position of each of pixels on the color original image is determined at the time of photometric processing, the central coordinates of the small region can be obtained by averaging positions of the pixels located at vertical and transverse ends of the small region at the time of photometric processing. Meanwhile, by calculating an average of positions of all pixels included in the small region at the time of photometric processing, the central coordinates of the small region can be obtained.

In subsequent step 106, a small region which is estimated to be a background of which size is largely different from the image size S is obtained, on the basis of the photographing information, from among the small regions subjected to the merging processing, a small region having a low probability of including the human image is obtained on the basis of the positional information, and these small regions thus obtained are eliminated as the non-main region. In step 108, a small region included in a color region of a predetermined range is extracted, as the effective region, from among other regions than the eliminated non-main region, namely, all remaining small regions including the small regions corresponding to the human image. In subsequent step 110, the strobe information an d the luminance information (average luminance), which are included in the photographing information, are used, the density of the human image is estimated on the basis of the photometric data of the extracted effective region, and data of the three colors of R, G, B of the estimated density are outputted. In step 112, a determination is made as to whether printing processing of all of the image frames has been completed. When a determination is made that the printing processing has been completed, the routine ends.

Figure 3:
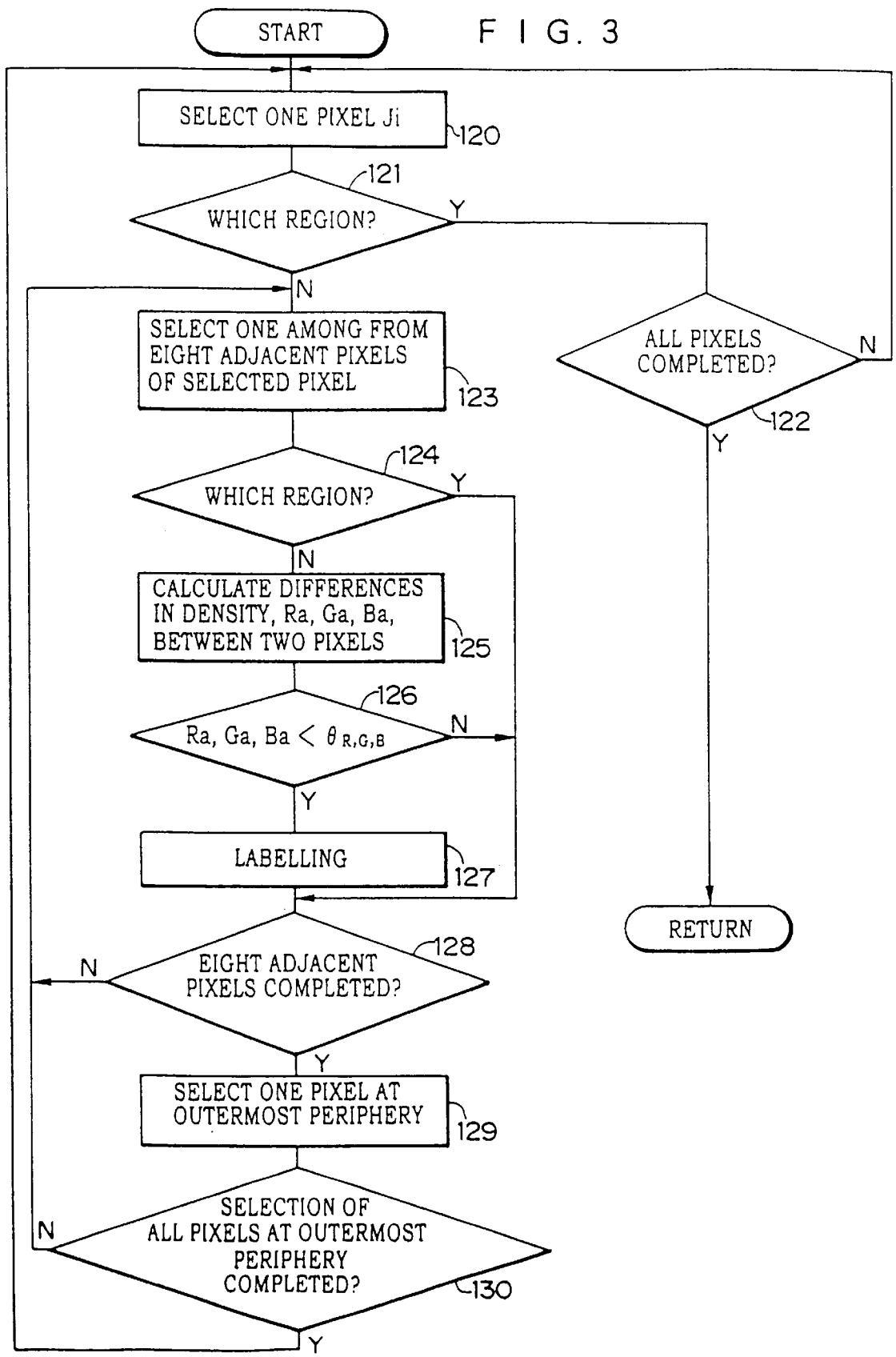
FIG. 3 is a flowchart showing details of step 104 in FIG. 2.
Figure 7A:
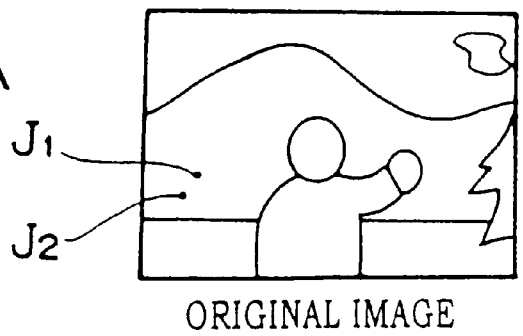
FIG. 7A is a diagram showing a color original image.

Next, the above-described steps 104 through 110 will be described in detail. FIG. 3 illustrates details of step 104. In step 120, any one pixel Ji (i=1 to n: n is the total number of pixels) is selected from the original image by raster scanning or the like. For example, the pixel $J_1$ shown in FIG. 7A is selected. In subsequent step 121, a determination is made as to whether the selected pixel is included in a small region to which a label (described later) has been already applied. When the decision of step 121 is "YES", in step 122, a determination is made as to whether selection for all of the pixels on the original image has been completed, the above-described processing is repeated until the selection for all of the pixels is completed.

When the selected pixel Ji is not included in the small region to which the label is applied, the process proceeds to step 123, in which any one pixel (one of eight adjacent pixels) is selected from the pixels located around the selected pixel Ji. For example, the pixel $J_2$ shown in FIG. 7A is selected. In step 124, a determination is made as to whether the selected pixel is included in the small region to which some label has been already applied. When the decision of step 124 is "NO", the process proceeds to step 125. In step 125, as illustrated in the following formula (3), differences, Ra, Ga, Ba of the photometric data of the three colors of R, G, B are calculated for the two selected pixels $J_1$, $J_2$.

$$Ra=R_1-R_2, Ga=G_1-G_2, Ba=B_1-B_2 \qquad (3)$$

wherein, $R_1$, $G_1$, $B_1$: photometric data of the three colors of R, G, B of the pixel $J_1$.
$R_2$, $G_2$, $B_2$: photometric data of the three colors of R, G, B of the pixel $J_2$.

In subsequent step 126, a determination is made as to whether the selected two pixels are similar to each other by making a determination as to whether $\theta_R \leq Ra$, $\theta_G \leq Ga$, and $\theta_B \leq Ba$. The predetermined ranges, $\theta_R$, $\theta_G$, and $\theta_B$ are set in advance. When the difference therebetween is included in the predetermined range, a similarity between the two pixels is high, and when the difference is out of the predetermined range, the similarity is low. When the two pixels are similar to each other, in step 127, processing for applying identical labels to the two pixels is effected (i.e., labeling) and the process proceeds to step 128. On the other hand, when they are not similar, labeling processing is not effected and the process proceeds to step 128.

Figure 7B:
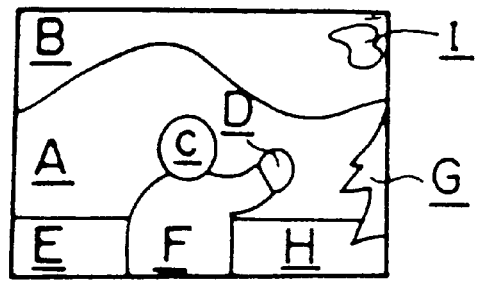
FIGS. 7B through 7D are diagrams for illustrating processes for extracting a small region including a face of an original image.

In step 128, a de termination is made as to whether the above processing has been effected for all of the eight adjacent pixels. When some of the eight adjacent pixels has not been processed, the process returns to step 123. When processing for all of the eight adjacent pixels has been completed, the process proceeds to step 129, in which one pixel at an outermost periphery of the small region (on the color original image) to which the identical label is applied is selected. Subsequently, in step 130, a determination is made as to whether selection of all pixels at the outermost periphery of the small region has been completed. When the decision of step 130 is "NO", the process returns to step 123 and the above-described processing is executed again. When the decision of step 130 is "YES", the process returns to step 120, in which the next pixel Ji is selected and the above-described processing is repeated. When the above merging processing has been effected for the entire one image surface of the color original image, the routine ends. In the example shown in FIG. 7A, after the routine has been completed, the labels A through I are applied as shown in FIG. 7B.

When the identical labels are applied for the adjacent pixels having similarity in order from the pixels at the outermost periphery of the small region to which the identical label is applied, the merging processing for pixels having similar density of the three colors of R, G, B, i.e., similar hue, can be effected for the adjacent pixels on the color original image.

Meanwhile, the merging processing is not limited to that for the above-described eight adjacent pixels. A well-known merging processing, or a processing in which pixels having similar hue (i.e., pixels having substantially the same color and same density) are merged on the color original image subjected to division processing may also be used.

Next, step 106 shown in FIG. 2 will be described in detail.

In the case of photographing a person by using a photographing device such as a camera, it is a high possibility that a region whose size is largely different from that of the human image such as a human face on the color original image is an image such as a background or the like, not including the human image. The present inventors have obtained the knowledge that there is a correlation between the area of the human image and a value obtained by squaring a magnification. Accordingly, as shown in FIG. 8, when a background region detection curve is set in a coordinate system with the value obtained by squaring magnification set as the X axis and the number of pixels set as the Y axis so as to substantially entirely include a previously-measured sample plot which corresponds to the human image (small region) on the color original image, there is a high probability that the small region located at a position included in an interior of the background region detection curve is that corresponding to the size of the human image. As a result, there is a high probability that the small region on the color original image, which corresponds to the position in a predetermined region included in an interior of the background region detection curve (in FIG. 8, the predetermined region being located on the side of slanting lines of the curve, which will be hereinafter referred to as a FACE-AREA region) corresponds to the size of the human image, and there is a high probability that the small region on the color original image, corresponding to a position not provided in the FACE-AREA region, is not the human image, for example, a background or the like.

Meanwhile, FIG. 8 shows, for a color original image sample having 3,098 frames, the background region detection curve which is a combined line (i.e., a bent line) formed from two straight lines obtained from the relationship between the number of pixels during photometric processing included in the human image corresponding to the area of the human image and the value obtained by squaring the magnification. However, the background region detection curve is not limited to that shown in FIG. 8, and a linear curve, a high-order curve, or a curve set by a non-linear function may also be applied.

Further, the FACE-AREA region included in an interior of the above background region detection curve is specified as a range having a high probability of including the human image corresponding to a face region, but a region of a predetermined range (i.e., the number of pixels) corresponding to the magnification may be set as the FACE-AREA region. As a result, small regions which are extremely large or small with respect to the magnification can be excluded, and the small region whose size changes in accordance with the magnification, for example, the small region of the human image corresponding to the person's face can be specified.

In the case of photographing a person by using a photographing device such as a camera, it is a high possibility that the human image such as the person's face is located in a vicinity of the center of the color original image. The present inventors have obtained the knowledge that, if the position of the human image on the color original image is known, the non-main image region having a low probability of including the human image is located around the human image.

Figure 14A:
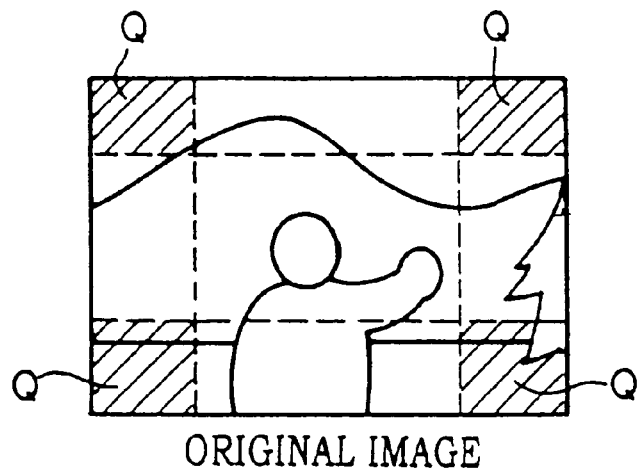
FIGS. 14A and 14B are diagrams for illustrating a non-main region.

As shown in FIG. 14A, when it is determined from the positional information P that the human image such as a human face or the like is located only in proximity to the center of the color original image, four corner portions Q of the color original image become non-main regions having a low probability for the human image to be located. Accordingly, even the small region of which size is substantially coincident with that of the human image has a high probability of not being the human image so long as the small region includes at least one portion of the portion Q. The portion Q is set as the non-main region Q. The position and range of the non-main region Q vary in accordance with the position of the human image on the color original image. For this reason, it is preferred that the pixels of the four corners at the outermost periphery of the color original image are set as the non-main region pixels and the small region including the non-main region pixels is set as the non-main region Q. When the small region including the non-main region pixels is set as the non-main region Q, it is possible to determine the non-main region, for each of the color original images, from among the small regions into which the color original image is divided without previously setting the size of the non-main region Q.

Figure 14B:
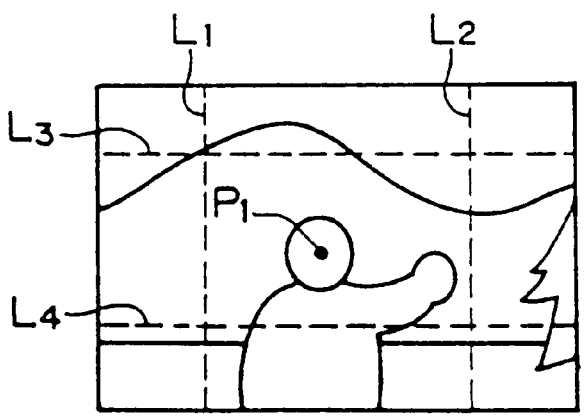

Further, setting of the non-main region Q is effected in such a manner as described below. As shown in FIG. 14B, the central coordinates $P_1$ of the human image are obtained by using the positional information P. The central coordinates $P_1$ are provided by dividing the color original image into m×n segments and obtaining a centroid position of the remarked region B which is the positional information P. Further, the central coordinates of the small region which is partially or entirely is included in the remarked region B may be used. Straight lines $L_1$, $L_2$ extending in the vertical direction are set at positions separated from the central coordinates $P_1$ at a predetermined distance, and straight lines $L_3$, $L_4$ which are substantially perpendicular to the straight lines $L_1$, $L_2$ so as to extend in the horizontal direction are set at positions separated from the central coordinates $P_1$ at a predetermined distance. The minimum region divided by the straight lines $L_1$, $L_3$, the minimum region divided by the straight lines $L_1$, $L_4$, the minimum region divided by the straight lines $L_2$, $L_3$, and the minimum region divided by the straight lines $L_2$, $L_4$ are each set as the non-main region Q.

Meanwhile, the non-main region Q is set by setting an outer side of a circle having a predetermined radius previously determined from the central coordinates $P_1$. Further, the above straight lines may be combined. In addition, in the foregoing, the non-main region Q is set by using the straight lines, but a previously-set circular arc or curve may be used. Further, since the non-main region Q also varies due to the magnification, the non-main region Q is preferably set in accordance with the magnification.

Figure 19A:
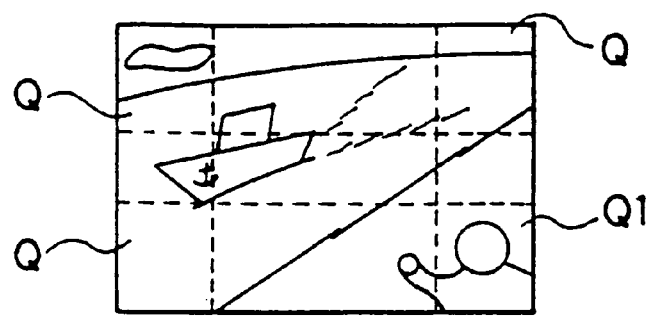
FIGS. 19A and 19C are diagrams each showing a color original image.

In the foregoing, the case was described in which the human image is located in proximity to the center of the color original image. However, as shown in FIG. 19A, there is a possibility that the human image is located in the vicinity of four corners of the color original image. In this case, the human image is eliminated as a background. Accordingly, when a determination is made from the read positional information P that the human image is located in the vicinity of the four corners of the color original image, the non-main region including regions in the vicinities of the four corners, which is determined from the positional information P, is excluded from the non-main region Q. In the example shown in FIG. 19A, the non-main region Q1 on a lower right side of the paper of this drawing is excluded from the non-main region Q. In this way, the small region having a low probability of including the human image can be eliminated from the color original image with the human image being left thereon.

Figure 19B:
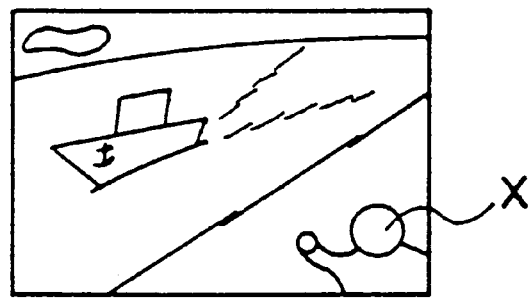
FIGS. 19B and 19D are diagrams for illustrating processes of extracting small regions including faces of an original image.
Figure 19C:
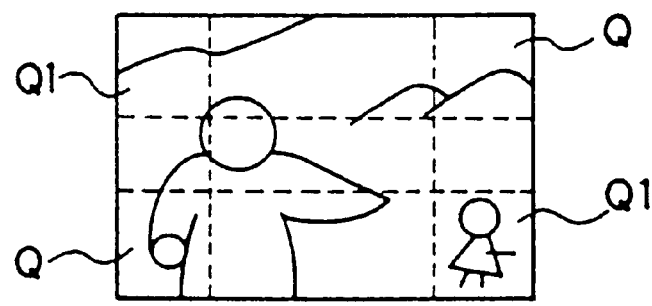

Further, when a plurality of positional information P is obtained (see FIG. 18 and FIG. 19C), the non-main region including portions in the vicinities of the four corners, which is determined from the positional information P, is excluded from the non-main region Q in such a manner that any of the plurality of positional information P (remarked regions B) is not excluded. In the example shown in FIG. 19C, the non-main regions Q1 on the upper left and lower right sides of the paper of this drawing are excluded from the non-main region Q1.

Figure 4:
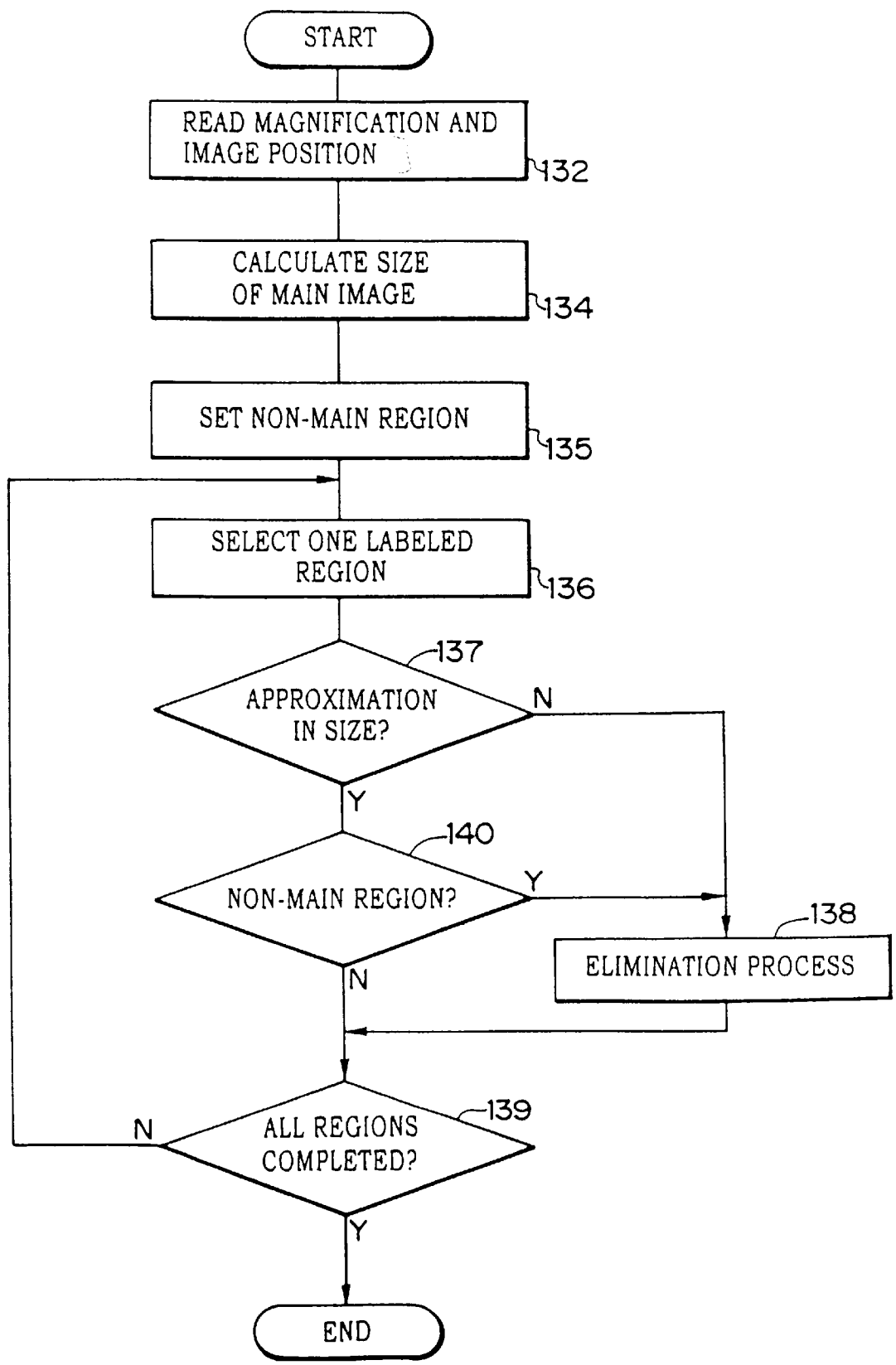
FIG. 4 is a flowchart showing details of step 106 in FIG. 2.

In detail, when step 106 shown in FIG. 2 is executed, the process proceeds to step 132 shown in FIG. 4, in which the magnification m and the positional information P indicating the position (image position) of the human image are read from the photographing information. In subsequent step 134, the size of the human image, i.e., the image size S, is calculated by using the above-described formulae (1), (2). In step 135, on the basis of the positional information P, the non-main region Q is set in such a manner as described above.

In subsequent step 136, one small region on the original image formed of groups of pixels subjected to labeling processing in step 127 of FIG. 3 is selected. In step 137, when the coordinates of the value obtained by squaring the magnification m and the area (number of pixels) of the small region on the color original image are not included in the FACE-AREA region, a determination is made that the selected small region is an image of a background or the like, not including the human image. Namely, by determining whether the size of the selected small region is included in the FACE-AREA region, a determination is made as to whether the selected small region approximates the size of the human image. When a determination is made that the selected small region does not approximate, in step 138, this small region is regarded as the non-main region such as a background region and is eliminated. Thereafter, the process proceeds to step 139. The processing in step 138 can be effected in a manner equivalent to elimination of the small region by releasing the label for only the selected small region. On the other hand, when a determination is made that the selected small region approximates, the process proceeds to step 140.

In step 140, a determination is made as to whether the selected small region is a non-main region having a low probability of including the human image. Namely, a determination is made as to whether at least one portion of the selected small region is included in the non-main region Q, as explained above. This determination can be made by determining whether the position of the pixel at the outer periphery of the small region is included within the non-main region Q. When one portion of the small region is included in the non-main region Q, the small region is a non-main region having a low probability for the human image to be positioned. For this reason, the process proceeds to step 138, in which the small region is regarded as the non-main region and is eliminated. Thereafter, the process proceeds to step 139. In the example shown in FIG. 7A, the small region corresponding to the size of the human image is included in the non-main region Q and is thereby eliminated. On the other hand, when the small region is not included in the non-main region Q, the process proceeds to step 139.

Figure 7C:
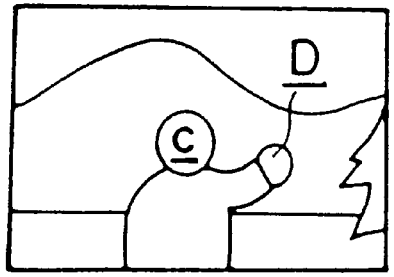
Figure 19D:
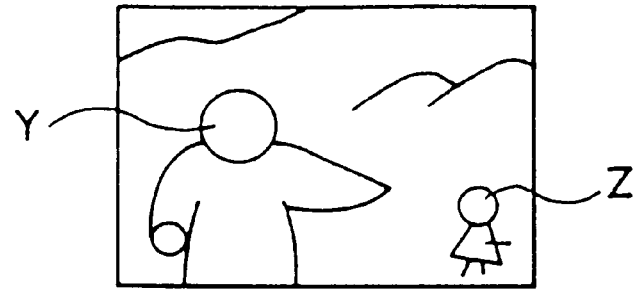

In subsequent step 139, a determination is made as to whether the above-described processing has been completed for all of the labeled small regions on the color original image. When an unprocessed small region exists, the process returns to step 136, and the above-described processing is repeated. When the above-described processing has been completed for all of the small regions, the routine ends. Accordingly, after the routine ends, the human image, for example, the small region including a human face remains at a high probability. In the example shown in FIG. 7A, after the routine ends, the label C and the label D remain as shown in FIG. 7C. Further, in the example shown in FIG. 19A, the human image is positioned in the vicinity of any of four corners of the color original image, but is not eliminated as a background, and the label X remains (see FIG. 19B). Further, in the example shown in FIG. 19C, a plurality of human images are positioned in the vicinities of four corners of the color original image, but are not eliminated as the background, and the label Y and the label Z remain (see FIG. 19D).

As described above, even the small region having the substantially same size of the human image, the small region being located in a region (for example, somewhere at four corners) having a low probability for the human image to be located, can be eliminated on the basis of the positional information of the human image, and other small regions not including the human image can be eliminated at a higher probability.

Next, details of step 108 shown in FIG. 2 will be described with reference to FIG. 5. Step 108 is a process for extracting, as the effective region, the small region of which characteristic values coincide with the conditions explained below so as to extract the small region still nearer the human image from all of the small regions remaining after the non-main regions have been eliminated.

The following condition A is a condition for classifying the small regions, the condition being previously obtained by statistical processing for the average densities of the three colors of R, G, B of each of a large number of color original images.

Condition A (1) $R_{min} < R_i < R_{max}$ (2) $G_{min} < G_i < G_{max}$ (3) $B_{min} < B_i < B_{max}$ wherein, $R_i$, $G_i$, $B_i$: average densities of the three colors of each small region.

$R_{min}$, $G_{min}$, $B_{min}$: minimum values $R_{max}$, $G_{max}$, $B_{max}$: maximum values In the present embodiment, in order to set the condition A, a dispersion of the density of each of the three colors is measured for each of the large number of human image samples, a range of the average density which can form the human image is obtained for each of the three colors on the basis of the measurement results, and upper and lower limit values of the obtained range are stored for each of the three colors. As a result, since the respective ranges of the average densities of the three colors which can form the human image are determined, classification of the small regions for each of the three colors can be made as to whether the small region corresponds to the human image. Accordingly, the small region which coincides with the condition A and fulfills the requirements of (1) to (3) has a high probability of including the human image.

The following condition B of color difference can be added to the above-described condition A. This condition B is a condition for classifying the small regions, the condition being provided to determine differences between the average densities of the three colors, namely, a tendency of hues of the small region.

Condition B
(4) RGmin<Ri−Gi<RGmax
(5) GBmin<Gi−Bi<GBmax
wherein, RGmin, GBmin: minimum values.
RGmax, GBmax: maximum values.

In order to set the condition B, the differences in density between the three colors, namely, the dispersion of color difference is measured for each of a large number of human image samples, an average range of color difference which can form the human image is obtained from the measurement results, and upper and lower limit values of the obtained range are stored for each of the three colors. As a result, the differences in density between the three colors which can form the human image, namely, the range of color difference is determined, and classification of the small regions for each of the color differences, namely, classification thereof based on the tendency of hues can be made as to whether the small region corresponds to the human image. Accordingly, the small region which coincides with the condition B and satisfies the requirements of (1) to (5) has a high probability of including the human image.

Figure 9:
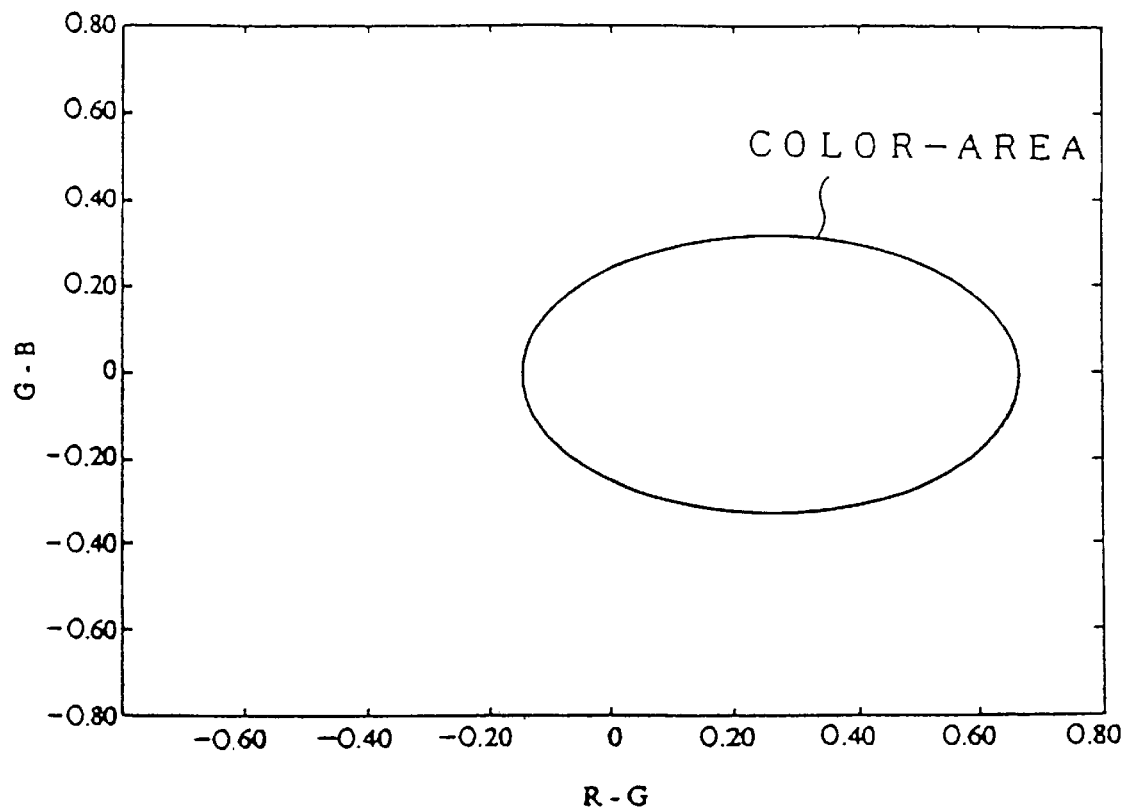
FIG. 9 is a diagram showing a range of color (color-area) in which an effective region including a human image exists.

Further, the present inventors have obtained the knowledge that the human images are distributed in clusters on color coordinates. Accordingly, as other conditions than the aforementioned, setting of the average range of color difference which can form the human image on the color coordinates can be made. For example, as shown in FIG. 9, a color difference region surrounded by an elliptical curve, the region having a high probability of being the face region (which is an interior of the elliptical region shown in FIG. 9 and will be referred to as a "COLOR-AREA") is set on the color coordinates in which the differences in density between two colors (i.e., color differences), G-B, R-G, are set as coordinate axes. This color-area is determined in such a manner that a large number of color original image samples including the face region as the human image is statistically processed, all pixels within the face region (human image) existing on the color original image are plotted, and a boundary is set so as to include substantially all of the plotted pixels. Accordingly, this color-area has a tendency of the hue in which it is a high probability of including the face region. Since the color-area includes colors of pixels within the human image, so long as the small region corresponding to the interior of the color-area is extracted, the small region including the human image can be selected with high accuracy, and the effective region having a high probability of being the human image can be set.

The boundary of the color-area can be set by an ellipse expressed by the following formula (4).

$$(x-RGc)^2/A^2+(y-GBc)^2/B^2=1 \qquad (4)$$

wherein,
RGc: coordinate value of axis R-G (for example, 0.25).
RBc: coordinate value of axis G-B (for example, 0).
A: constant (for example, 0.43).
B: constant (for example, 0.38).

Accordingly, as the condition to be read in step 142, the following condition C can be added. Further, the condition C may be used in place of the condition B.

Condition C
(6) $GBc-B\cdot\sqrt{(A^2-(Ri-Gi-RGc)^2)}<Gi-Bi<GBc+B\cdot\sqrt{(A^2-(Ri-Gi-RGc)^2)}$ wherein, RGc, GBc: central coordinates of the ellipse on the coordinates R-G, G-B.
A, B: radii of the ellipse (see the formula (4)).

Accordingly, by introducing the condition C, the small regions existing in the distribution range of color difference of an actual human image can be selected, and there is a higher probability that the small region which satisfies requirements of (1) through (6) is the human image.

Meanwhile, in the present embodiment, the non-main region is eliminated in the above-described step 106. However, in step 108, the size and position of the human image determined by the magnification and the positional information may be added as a condition.

Figure 5:
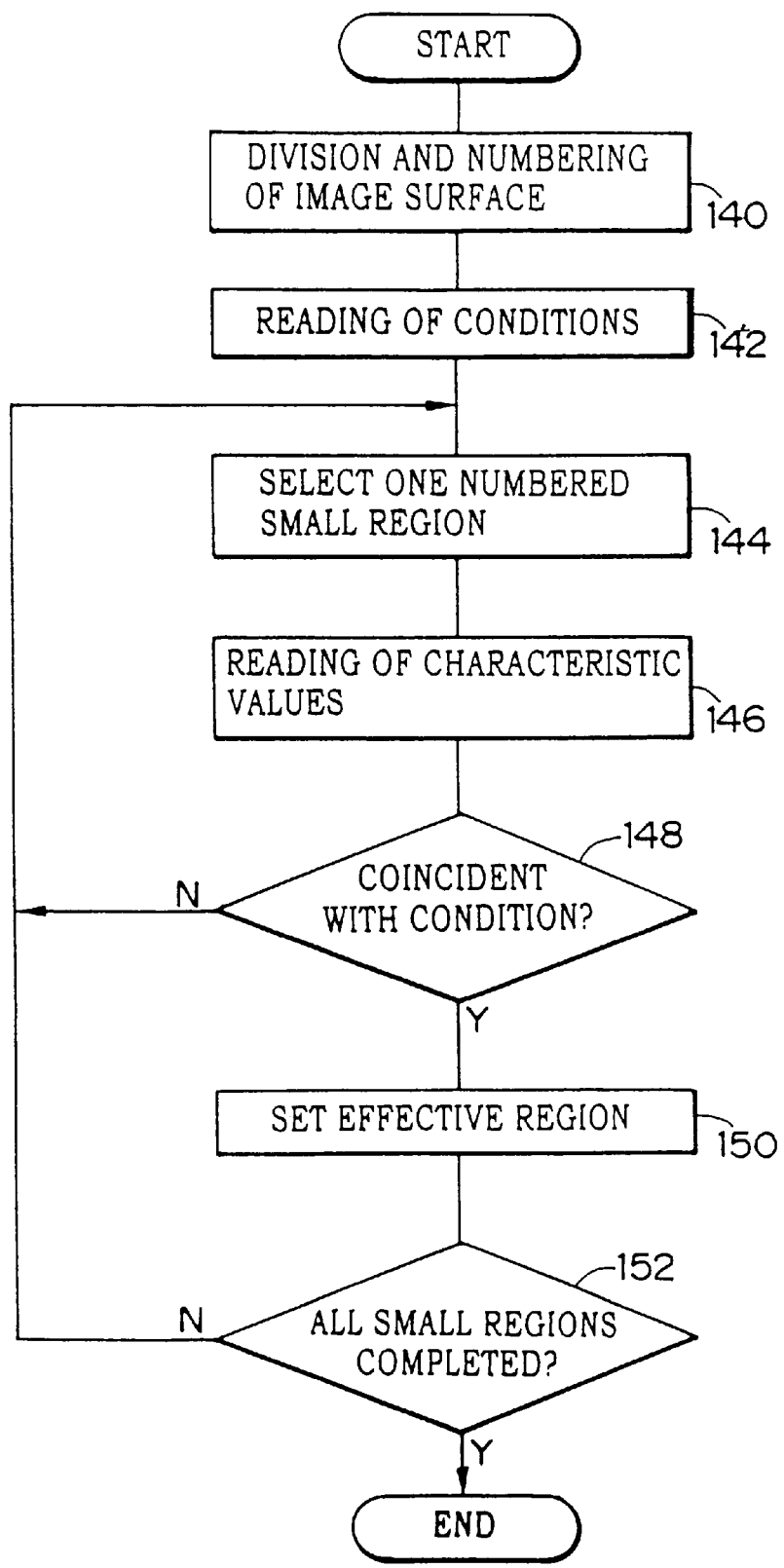
FIG. 5 is a flowchart showing details of step 108 in FIG. 2.
Figure 7D:
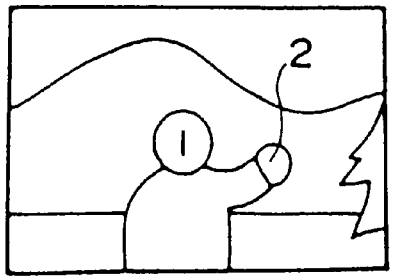

Specifically, when step 108 shown in FIG. 2 is executed, the process proceeds to step 140 shown in FIG. 5, in which the labeled small regions on the color original image are numbered (see FIG. 7D). In this case, the small region whose size is largely different from that of the human image and the small region at a position in which there is a low probability for the human image to be located are eliminated. In subsequent step 142, the above conditions are read.

Subsequently, in step 144, one small region is selected from among the above numbered small regions, and the characteristic values of the selected small region (obtained in step 105 of FIG. 2) is read in step 146. In subsequent step 148, a determination is made as to whether the characteristic values of the selected small region coincide with the conditions, and when the decision of step 148 is "NO", the process returns to step 144, and the above-described processing is repeated for other small regions. On the other hand, when the decision of step 148 is "YES", the selected small region has a high probability of including the human image, and therefore, in step 150, the selected small region is set as one of the effective regions. The above-described processing is repeated until all of numbered small regions have been processed.

As described above, by selecting the small region on the basis of a tendency of hues due to the average densities of the colors for each of the small regions and the average color differences, the small region including the human image can be selected with high accuracy and the effective region having a high probability of including the human image can be set.

Next, step 110 shown in FIG. 2 will be described in detail.

It is a possibility that the small region excluding the human image which cannot be eliminated as the above non-main region remains in the effective region extracted from the color original image. Accordingly, the present inventors have carried out an experiment as to how the densities of the human image included within the effective region are distributed when a large number of color original images with a person being photographed is used (i.e., the density distribution of human image samples is obtained and processed statistically). As a result, they have obtained the knowledge that, particularly in the case of a color original image photographed by emission of strobe light, there is a tendency that, as shown in FIG. 10, most of the densities of the human image which is the face region are biased toward the side of a high density on the density histogram. Further, the present inventors have carried out an experiment by using a large number of color original image samples photographed by emission of strobe light and have obtained the knowledge that the average densities of the three colors for all of the pixels included in the effective region substantially coincides with the density of the human image.

Further, as a result of statistical processing using a large number of color original image samples, the present inventors have also obtained the knowledge that the position where the densities of the human image are distributed have relation to the average luminance. Namely, the density of the human image varies in accordance with the average luminance among the conditions at the time of photographing.

Meanwhile, the above-described average luminance means an average luminance prior to emission of strobe light when the photographing device is equipped with a strobe device. Further, in the present embodiment, the average luminance means Bv value (subject average luminance) defined by the following formula (5) in an APEX SYSTEM (additive system of photographic exposure).

$$Av+Tv=Bv+Sv=Ev \quad (5)$$

wherein,

Av: diaphragm value.

Tv: shutter speed.

Bv: subject average luminance (see the following formula (6)).

Sv: photographic film sensitivity (see the following formula (7)).

Ev: Exposure value.

$$Bv=\text{Log}_2(B/NK) \quad (6)$$

$$Sv=\text{Log}_2(NSx) \quad (7)$$

wherein,

B: brightness (luminance) of a subject.

N,K: constants.

Sx: speed value of a photosensitive material (for example, film speed or ISO speed).

The present inventors have made collection and effected statistical processing of data of the density of the human image within the effective region and data of the average luminance of the color original image, particularly, by using a large number of color original image samples in which a person is photographed under the emission of strobe light. As a result, as shown in FIG. 11, they have found that the density of the human image (a face region) has a distribution tendency of increasing when the average luminance of the color original image prior to the emission of strobe light is low, and also has a distribution tendency of decreasing when the average luminance becomes high. Accordingly, the density of the human image when the average luminance is low and a person of dark color is photographed varies toward the density, an side of a high density, and the density of the human image when the average luminance is high and a person of light color is photographed varies toward the side of a low density.

As a result, in a case in which the density of a highest population is set as a reference density in the density histogram which indicates a relationship between the number of pixels and the density for the effective region extracted from the color original image, it can be estimated that, when the average luminance is high, the density of the human image on the color original image varies from the reference density to the side of low density, and when the average luminance is low, the density of the human image varies from the reference density to the side of high density. Accordingly, a characteristic region in the density histogram with the densities of the human image being distributed is located in the vicinity of a position moved from the reference density by a predetermined amount in accordance with the average luminance of the color original image, and the average density of the pixels included within a characteristic range on the density histogram which is the above-described characteristic region can be estimated to be the density of the human image. Meanwhile, the predetermined amount can be statistically calculated from the relationship between the average luminance and the density. Further, as the reference density, a previously set density value may be used in place of the density of highest population Further, the present inventors have obtained experimental results that, when the average luminance is low, the characteristic range on the color original image photographed by the emission of strobe light varies largely, and when the average luminance is high, the densities of the human image do not vary very much from the average characteristic range. Accordingly, in the present embodiment, in order to determine the above-described characteristic range, the density histogram is expressed in terms of area, and on the basis of the average luminance prior to the emission of strobe light, the ratio between the total area of the density histogram and the area of the characteristic range is obtained by the following formula (8). As shown in FIG. 13, a predetermined value Dra of density for division of the density histogram is calculated from the obtained area ratio R, and a region on the divided density histogram located on the side of a high density is set as the characteristic range.

In other words, when the average luminance Mbv prior to the emission of strobe light is less than or equal to a predetermined value Cons which is a standard for judgment, the distribution of the density of the human image has a tendency of becoming lower. For this reason, the area ratio R of the histogram is obtained by using the following formula (8) and the characteristic range is determined. On the other hand, when the average luminance Mbv exceeds the predetermined value, the density of the human image is within the average characteristic range, and therefore, the area ratio R of the histogram is set at the predetermined value $C_3$.

$$\text{Cons}=(C_3-C_2)/C_1$$

$$R=C_1 \cdot Mbv+C_2 \quad (8)$$

wherein, $C_1$, $C_2$, $C_3$: constants (for example, $C_1$=0.031, $C_2$=0.24, $C_3$=0.56).

Further, it is a high possibility that the color original image photographed without using strobe light is photographed in such a manner that sufficient light is applied to a person. However, in the case of photographing under a back lighting condition, the density of the human image varies. Accordingly, the present inventors have effected statistical processing for a large number of color original image samples photographed without using strobe light, and as a result, they have found that, when the back-light information which indicates whether the photographing processing is effected under a back light condition can be obtained, the color original image photographed under the back light condition has a tendency of density distribution that the density of the human image is low in which the density distribution of a non-main region exists on the side of high density including the highest population on the density histogram, and the color original image photographed under the front light condition has a tendency of density distribution that the density of the human image is high in which the density distribution of the non-main region exists on the side of low density including the lowest population.

Figure 15:
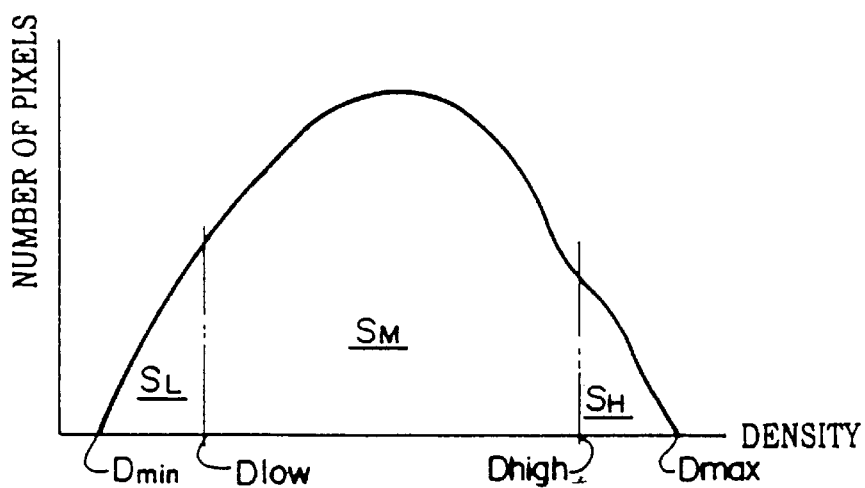
FIG. 15 is a diagram for illustrating a characteristic range in a density histogram determined by back light information.

When the back light information Rbv which indicates the grade of the back light (for example, the difference between the luminance in a region near a subject such as a person, and the luminance at a central portion of the original image) is obtained, the characteristic range can be determined in such a manner as described below. As shown in FIG. 15, when the density histogram for all of the pixels in the effective region has a density distribution from the minimum density Dmin to the maximum density Dmax, density Dlow is defined as the boundary for front light processing, and density Dhigh is defined as the boundary for back light processing. Regions into which the density histogram is divided by the densities Dlow, Dhigh are referred to as areas $S_L$, $S_M$, $S_H$ (the area S of the effective region=$S_L+S_M+S_H$) in order from the low density side. The area $S_L$ can be obtained by counting the number of pixels included in the region on the density histogram from the minimum density Dmin to the density Dlow, the area $S_M$ can be obtained by counting the number of pixels included in the region on the density histogram from the density Dlow to the density Dhigh, and the area $S_H$ can be obtained by counting the number of pixels included in the region on the density histogram from the Dhigh to the maximum density Dmax.

Usually, in the case of photographing processing under the back light condition, the photographing condition in which the difference in luminance between the region near the subject and the central portion is greater than or equal to 1 (unit: EV) is provided. For this reason, when Rbv≦1, the front light processing is effected, and when Rbv>1, the back light processing is effected. In the front light processing, the area ratio ($S_M/S$) is set by the following formula (9), and in the back light processing, the area ratio ($S_M/S$) is set by the following formula (10).

Front Light $$S_H=0$$

$$S_M/S=(Rbv+CC_1)/CC_2 \quad (9)$$

Back Light $$S_L=0$$

$$S_M/S=(CC_3-Rbv)/CC_2 \quad (10)$$

wherein, $CC_1$, $CC_2$, $CC_3$: constants (for example, $CC_1$=9, $CC_2$=10, $CC_3$=11).

Figure 16:
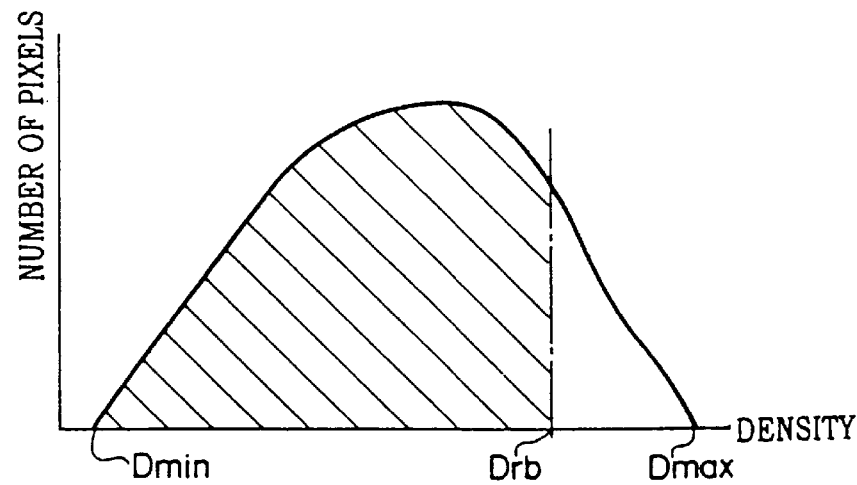
FIG. 16 is a diagram for illustrating a characteristic range in the density histogram at the time of back lighting.
Figure 17:
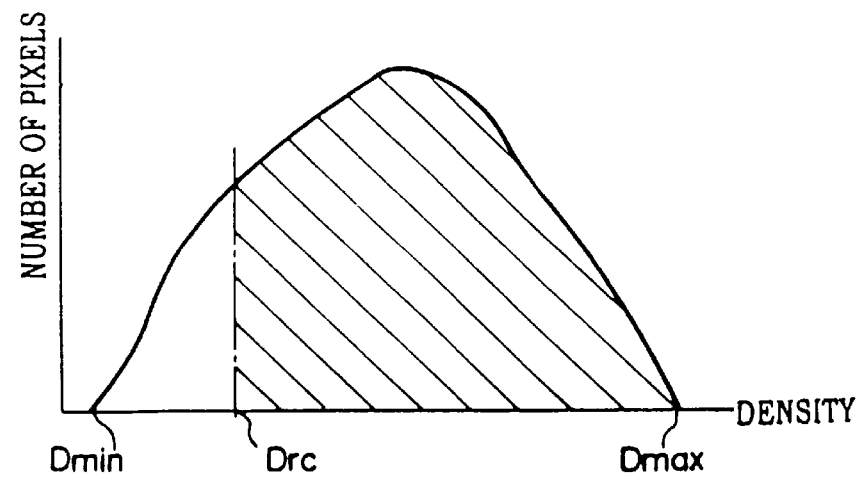
FIG. 17 is a diagram for illustrating a characteristic range in the density histogram at the time of front lighting.

The density Dlow or Dhigh thus obtained is set as a predetermined value of density for dividing the density histogram. Accordingly, as shown in FIG. 16, in the case of the color original image subjected to the back light photographing, the range from the minimum density Dmin to the boundary on the high density side (i.e., the predetermined density value Drb for division of the density histogram) without a region of the density corresponding to the non-main region in the vicinity of the maximum density Dmax caused by the back light photographing being included can be set as the characteristic range (indicated by the slanting lines in FIG. 16). Further, as shown in FIG. 17, in the case of the color original image subjected to the front light photographing, the range from the boundary on the low density side (i.e., the predetermined density value Drc for division of the density histogram) to the maximum density Dmax without the density region corresponding to the non-main region in the vicinity of the minimum density Dmin caused by the front light photographing being included, can be set as the characteristic range (indicated by the slanting lines in FIG. 17).

Meanwhile, when only a value which indicates one of front light and back light (for example, 1-bit flag) is obtained as the back light information, it suffices that a previously set area ratio for each of the front light and the back light is set. It suffices that the area ratio is set at a value ranging from about 0.6 to 0.9, and the value is preferably set at 0.8 so that the characteristic range of a standard color original image in which the back light information can be obtained is included. Meanwhile, it suffices that the area ratio of the characteristic range is previously determined statistically for each of the large number of color original image samples, so that the predetermined density value for dividing the density histogram may be selected.

Accordingly, by obtaining the density histogram of the average densities of the three colors of R, G, B, for each of all pixels included in the extracted effective region, setting the characteristic range within the density histogram on the basis of the average luminance, and obtaining the average density of all pixels included within the feature range, the density still nearer the density of the human image on the color original image than the average density of all pixels included in the effective region is obtained and the obtained density can be estimated to be the density of the human image.

Specifically, when extraction of the effective region is completed and step 110 shown in FIG. 2 is executed, the process proceeds to step 160 shown in FIG. 6, in which the density histogram which represents the relationship between the number of pixels and the density is prepared for the effective region extracted from the color original image.

Subsequently, in step 168, strobe information and luminance information (average luminance) included in the photographing information are read, and the process proceeds to step 164. When the back light information is included in the photographing information, the back light information is also read. In step 164, a determination is made as to whether a color original image is photographed under the emission of strobe light. When the decision of step 164 is "YES" (i.e., when the color original image is photographed under the emission of strobe light), in step 168, the boundary for dividing the density histogram (the predetermined density value Dra) is determined by using he luminance information and by referring to the above-described formula (8). In subsequent step 174, the range from the boundary to the high density side is selected as the characteristic range. On the other hand, when the color original image is photographed without using the emission of strobe light, the decision of step 164 is "NO" and the process proceeds to step 166.

In step 166, a determination is made as to whether the back light information is included in the read photographing information. When the decision of step 166 is "YES", in subsequent step 170, the boundary for dividing the density histogram (the predetermined density value Drb or the predetermined density value Drc) is determined by using the formula (9) or (10) in accordance with the kind of the back light information (i.e., the back light information which represents only one of the front light and the back light, or the back light information which represents the grade of the back light). In subsequent step 174, the range from a density value corresponding to the front light or the back light to the boundary is selected as the characteristic range. On the other hand, when there is no back light information and the decision of step 166 is "NO", in subsequent step 172, all of the extracted effective region are selected as the characteristic range. Meanwhile, when the strobe information does not exist and the back light information also does not exist, step 172 is executed.

In subsequent step 176, respective average densities of the three colors of R, G, B are calculated by using all of the pixels included in the selected characteristic range, and the calculated average densities are outputted, as a value corresponding to the density of the human image, to the exposure amount calculating circuit 40.

As described above, the characteristic density region of human image density is set as the characteristic range from the density histogram formed from all of the pixels within the effective region and by using the strobe information and the luminance information, and the average density of the characteristic range is estimated to be the density of the human image. Accordingly, the density of the human image can be obtained at a high probability irrespective of the average luminance at the time of photographing and the emission of strobe light.

In the exposure amount calculating circuit 40, a proper amount of exposure is determined by a well-known exposure amount calculating method. One example of the well-known exposure amount calculating method will be described hereinafter. By using the average density of the pixels included in the characteristic range which is estimated to be the human image and extracted in the background region elimination circuit 36 as described above (the average density being hereinafter referred to as a face region average density), and the average density $D_i$ (i=any one of R, G, and B) for one entire image surface calculated in the average density calculating circuit 38, the amount of exposure Ei is calculated in accordance with the following formula (6) and is outputted to the controller 42. The controller 42 calculates an exposure control value from the exposure amount $E_i$ so as to control the color correction filter 16.

$$\log E_i = LMi \cdot CSi \cdot (DN_1 - D_1) + PB_i + LB_i + MB_i + NB_i + K_1 + K_2 \quad (6)$$

wherein, the respective notations represent the following.
LM: magnification slope factor which is set in advance in accordance with an enlargement ratio determined from the type of the negative and the print size.
CS: color slope factor prepared for each type of negative, including underexposed and overexposed negatives. It is determined that the average density of a frame to be printed is either under or over a standard negative density value, and the color slope factor for either underexposure or for overexposure is selected.
DN: standard negative density value.
D: average density value of a print frame.
PB: correction balance value for a standard color paper, which is determined in accordance with the type of a color paper.
LB: correction lens balance value for a standard printing lens, which is determined in accordance with the type of a printing lens.
MB: correction value (master balance value) for fluctuations in a printing light source and variations in the paper development capability.
NB: negative balance value (color balance value) determined by characteristics of the negative film.
$K_2$: color correction amount.
$K_1$: density correction amount expressed by the following formula.

$$K_a \left[ \frac{D_R + D_G + D_B}{3} - \frac{FD_R + FD_G + FD_B}{3} \right] + K_b$$

Here, $K_a$ and $K_b$ are constants, and FD is the face region average density.

Further, a correction value determined by a film testing device may be used as the density correction amount $K_1$ in the above formula (6), and the color correction amount $K_2$ may be expressed by using the face region average density as described below.

$$(K_2)_i = K_c \left\{ \left[ FD_i \frac{FD_R + FD_G + FD_B}{3} \right] - \left[ DN_i - \frac{DN_R + DN_G + DN_B}{3} \right] \right\}$$

wherein, Kc is a constant.

As described above, in the present embodiment, after the background region having a low probability for the human image included in the color original image to be located, and the small regions included in the non-main region obtained from the positional information of the human image have been eliminated, the density of the human image can be estimated by using the strobe information and the luminance information and the amount of exposure can be determined on the basis of the estimated density. For this reason, the small region including the person's face can be extracted at a high probability from an image in which faces, ground, trees, and the like, which have similar hues, exist together, and small regions located at a position where the human image is not included can also be eliminated, and therefore, a region which is not required as data is eliminated. Accordingly, it is no possibility that the densities of the human image is outputted dispersedly, and the human image such as the face of the person can be printed at an appropriate density.

FIG. 12 shows a modified example in which the present invention is applied to an exposure amount determination device which is provided separately from a printer or a printer processor. It should be noted that the same members as those shown in FIG. 1 will be denoted by the same reference numerals, and a description thereof will be omitted. Further, the average density calculating circuit 38 is not necessarily needed. However, in place of the average density calculating circuit 38, a large area transmission density (LATD) detection circuit for detecting the LATD of the entire image surface may be used.

The present invention can also be applied to determine an amount of exposure of a digital color printer, determine a reproduction condition of a copier, determine an amount of exposure of a camera, determine a display condition of a CRT image surface, and determine a quantity of light when a hard copy is prepared from magnetic image data, in addition to the determination of an amount of exposure of the photographic printing device.

What is claimed is:

1. A method for determining an amount of exposure comprising the steps of:
   reading photographing information which indicates photographing conditions, the photographing information including positional information of a human image on a color original image, strobe information which indicates whether strobe light is on or off, and luminance information which indicates an average luminance of a subject including the human image prior to emission of the strobe light;

obtaining a size of the human image, which indicates at least one of a length in a vertical or transverse direction, an area, and an aspect ratio of the human image, on the basis of the photographing information;

dividing the color original image into a large number of pixels, separating each of the pixels into three colors of red light, green light and blue light, and photometrically measuring the red light, green light and blue light;

determining, on the basis of data obtained by photometry, densities of the three colors of red, green and blue of each of the pixels, and dividing the color original image into small regions formed from continuous pixels in which at least one of colors obtained from the densities of the three colors and densities are the same or are similar;

determining, on the basis of the positional information included in the photographing information, a predetermined region on the color original image in which the human image is not included;

selecting, as an effective region, a region including a small region which is of the same size as the human image or is greater than the size of the human image and excluding a small region of which at least one portion is included in the predetermined region;

by using densities of all pixels in the selected effective region, determining a density histogram, determining a characteristic range on the histogram on the basis of the strobe information and the luminance information which are included in the photographing information, and estimating a density of the human image on the basis of the densities of all pixels included in the characteristic range; and determining, on the basis of the estimated density, an amount of exposure for a copy media.

2. A method for determining an amount of exposure according to claim 1, wherein the photographing information includes magnification information, and on the basis of the magnification information, the size of the human image is determined.

3. A method for determining an amount of exposure according to claim 1, wherein at least one of average densities of each of the three colors, an average density of the three colors, and an average color difference obtained from the average densities of the three colors is determined for each of the small regions, and a region, which remains after a small region not included in a predetermined condition is eliminated, is selected as an effective region, the predetermined condition corresponding to the determined at least one of the average densities of each of the three colors, the average density of the three colors, and the average color difference obtained from the average densities of the three colors.

4. A method for determining an amount of exposure according to claim 2, wherein at least one of average densities of each of the three colors, an average density of the three colors, and an average color difference obtained from the average densities of the three colors is determined for each of the small regions, and a region, which remains after a small region not included in a predetermined condition is eliminated, is selected as an effective region, the predetermined condition corresponding to the determined at least one of the average densities of each of the three colors, the average density of the three colors, and the average color difference obtained from the average densities of the three colors.

5. A method for determining an amount of exposure according to claim 1, wherein when a determination is made, on the basis of the strobe information, that photographing is effected without using strobe light, an average density of all pixels included in the selected effective region is determined, and on the basis of the determined average density, an amount of exposure for a copy media is determined.

6. A method for determining an amount of exposure according to claim 2, wherein when a determination is made, on the basis of the strobe information, that photographing is effected without using strobe light, an average density of all pixels included in the selected effective region is determined, and on the basis of the determined average density, an amount of exposure for a copy media is determined.

7. A method for determining an amount of exposure according to claim 3, wherein when a determination is made, on the basis of the strobe information, that photographing is effected without using strobe light, an average density of all pixels included in the selected effective region is determined, and on the basis of the determined average density, an amount of exposure for a copy media is determined.

8. A method for determining an amount of exposure according to claim 4, wherein when a determination is made, on the basis of the strobe information, that photographing is effected without using strobe light, an average density of all pixels included in the selected effective region is determined, and on the basis of the determined average density, an amount of exposure for a copy media is determined.

9. A method for determining an amount of exposure according to one of claim 1, wherein the photographing information includes back light information, and on the basis of the back light information and the strobe information, the characteristic range is determined on the density histogram.

10. A method for determining an amount of exposure according to one of claim 2, wherein the photographing information includes back light information, and on the basis of the back light information and the strobe information, the characteristic range is determined on the density histogram.

11. A method for determining an amount of exposure according to one of claim 3, wherein the photographing information includes back light information, and on the basis of the back light information and the strobe information, the characteristic range is determined on the density histogram.

12. A method for determining an amount of exposure according to one of claim 4, wherein the photographing information includes back light information, and on the basis of the back light information and the strobe information, the characteristic range is determined on the density histogram.

* * * * *